(12) United States Patent
Katou

(10) Patent No.: US 8,447,418 B2
(45) Date of Patent: May 21, 2013

(54) CONTROL SYSTEM HAVING ELECTRONIC CONTROL UNITS AND ELECTRONIC CONTROL UNIT FOR THE SYSTEM

(75) Inventor: Kenji Katou, Aichi-ken (JP)

(73) Assignee: Denso Corporation, Kariya (JP)

( * ) Notice: Subject to any disclaimer, the term of this patent is extended or adjusted under 35 U.S.C. 154(b) by 314 days.

(21) Appl. No.: 12/932,606

(22) Filed: Mar. 1, 2011

(65) Prior Publication Data
US 2011/0245935 A1 Oct. 6, 2011

(30) Foreign Application Priority Data
Mar. 31, 2010 (JP) ................................. 2010-082494

(51) Int. Cl.
| G05B 11/01 | (2006.01) |
| G01M 17/00 | (2006.01) |
| G06F 7/00 | (2006.01) |
| G06F 19/00 | (2011.01) |
| G06F 11/30 | (2006.01) |
| B60G 17/0185 | (2006.01) |
| B60G 23/00 | (2006.01) |
| A01B 69/00 | (2006.01) |
| B62D 11/00 | (2006.01) |

(52) U.S. Cl.
USPC .................. 700/21; 700/19; 700/20; 700/27; 701/29.2; 701/29.7; 701/36; 701/39; 701/43; 701/63

(58) Field of Classification Search .................... 700/19, 700/20, 21, 27; 701/29.2, 29.7, 36, 39, 43, 701/63
See application file for complete search history.

(56) References Cited

U.S. PATENT DOCUMENTS

| 5,739,761 | A * | 4/1998 | Kobayashi | 701/29.2 |
| 6,625,516 | B2 * | 9/2003 | Niimi et al. | 700/170 |
| 7,245,225 | B2 * | 7/2007 | Kamio et al. | 340/648 |
| 7,248,959 | B2 * | 7/2007 | Enomoto et al. | 701/102 |
| 7,729,827 | B2 * | 6/2010 | Sakurai et al. | 701/31.7 |
| 8,036,786 | B2 * | 10/2011 | Kimoto | 701/32.7 |
| 8,306,688 | B2 * | 11/2012 | Nagata et al. | 701/33.2 |
| 2004/0029556 | A1 | 2/2004 | Goto et al. | |

FOREIGN PATENT DOCUMENTS

| JP | 03-220041 | 9/1991 |
| JP | 2000-148519 | 5/2000 |
| JP | 2001-022708 | 1/2001 |
| JP | 2004-017676 | 1/2004 |
| JP | 2004-291943 | 10/2004 |

OTHER PUBLICATIONS

Office Action mailed Apr. 3, 2012 in corresponding Japanese Application No. 2010-082494 (with English translation).

* cited by examiner

Primary Examiner — Ronald Hartman, Jr.
(74) Attorney, Agent, or Firm — Harness, Dickey & Pierce, PLC

(57) ABSTRACT

A control system has regular ECUs and a recovery ECU. Each regular ECU controls driving of current consumers, respectively, drivable by driving methods and connected through output channels. The recovery ECU has output drivers, respectively, producing driving currents based on the driving methods and channel changing blocks corresponding to the respective driving methods. When receiving information indicating failure of an output channel of one regular ECU, the recovery ECU specifies the driving method of the failed channel, controls the driver of the specified driving method to produce a driving current, and controls the changing block of the specified driving method to select one output channel, through which the current consumer connected with the failed ECU through the failed channel is also connected with the changing unit. The recovery ECU performs substitute driving instead of the failed ECU to supply the current to the consumer.

12 Claims, 10 Drawing Sheets

FIG. 4

| DRIVING METHOD (CHANNEL SPECIFICATION) | ECU | FAILURE TYPE | SAFETY LEVEL | | |
|---|---|---|---|---|---|
| | | | LOW | MIDDLE | HIGH |
| FIRST DRIVING METHOD | BODY ECU | DOOR LOCK OUTPUT FAILURE (A1ch) | ○ | | |
| | WIPER ECU | WIPER OUTPUT FAILURE (B1ch) | | ○ | |
| | ⋮ | ⋮ | ⋮ | ⋮ | ⋮ |
| SECOND DRIVING METHOD | BODY ECU | HEADLIGHTS OUTPUT FAILURE (A2ch) | | ○ | |
| | WIPER ECU | STOP LAMPS OUTPUT FAILURE (C2ch) | | | ○ |
| | ⋮ | ⋮ | ⋮ | ⋮ | ⋮ |
| ⋮ | ⋮ | ⋮ | ⋮ | | |

FIG. 7

| DRIVING METHOD (CHANNEL SPECIFICATION) | ECU | FAILURE TYPE | PRIORITY RELATING INFORMATION | | SAFETY LEVEL LOW → HIGH | | | |
|---|---|---|---|---|---|---|---|---|
| | | | | | 0 | A | B | C |
| FIRST DRIVING METHOD | BODY ECU | DOOR LOCK OUTPUT FAILURE (A1ch) | — | | | ○ | | |
| | WIPER ECU | WIPER OUTPUT FAILURE (B1ch) | RAIN DROP SENSOR | RAINFALL | | | | ○ |
| | | | | NO RAINFALL | ○ | | | |
| ⋮ | ⋮ | ⋮ | ⋮ | | ⋮ | ⋮ | ⋮ | ⋮ |
| SECOND DRIVING METHOD | BODY ECU | HEADLIGHTS OUTPUT FAILURE (A2ch) | ILLUMINANCE SENSOR | BRIGHT | | ○ | | |
| | | | | DARK | | | | ○ |
| | WIPER ECU | STOP LAMPS OUTPUT FAILURE (C2ch) | — | | | | | ○ |
| ⋮ | ⋮ | ⋮ | ⋮ | | ⋮ | ⋮ | ⋮ | ⋮ |
| ⋮ | ⋮ | ⋮ | ⋮ | | ⋮ | | | |

FIG. 8

| DRIVING METHOD (CHANNEL SPECIFICATION) | ECU | FAILURE TYPE | SAFETY LEVEL | | | PRIORITY RELATING INFORMATION | | NUMERICAL VALUE |
|---|---|---|---|---|---|---|---|---|
| | | | LOW | MIDDLE | HIGH | | | |
| FIRST DRIVING METHOD | BODY ECU | DOOR LOCK OUTPUT FAILURE (A1ch) | | ○ | | | | 00···010 |
| | WIPER ECU | WIPER OUTPUT FAILURE (B1ch) | | ○ | | RAIN DROP SENSOR | RAINFALL | 00···000 |
| | | | | | | | NO RAINFALL | 00···011 |
| | ⋮ | ⋮ | ⋮ | ⋮ | ⋮ | ⋮ | | |
| SECOND DRIVING METHOD | BODY ECU | HEADLIGHTS OUTPUT FAILURE (A2ch) | | ○ | | ILLUMINANCE SENSOR | BRIGHT | 00···010 |
| | | | | | | | DARK | 00···001 |
| | WIPER ECU | STOP LAMPS OUTPUT FAILURE (C2ch) | | | ○ | | | 00···000 |
| | ⋮ | ⋮ | ⋮ | ⋮ | ⋮ | ⋮ | | |
| ⋮ | ⋮ | ⋮ | ⋮ | | | ⋮ | | |

US 8,447,418 B2

CONTROL SYSTEM HAVING ELECTRONIC CONTROL UNITS AND ELECTRONIC CONTROL UNIT FOR THE SYSTEM

CROSS-REFERENCE TO RELATED APPLICATION

This application is based upon and claims the benefit of priority of the prior Japanese Patent Application 2010-82494 filed on Mar. 31, 2010, so that the contents of which are incorporated herein by reference.

BACKGROUND OF THE INVENTION

1. Field of the Invention

The present invention relates to a control system in which a plurality of electronic control units perform data communication with one another to drive current consumers under control of the electronic control units, and one electronic control unit used for the control system.

2. Description of Related Art

A plurality of electronic control units (hereinafter, called ECUs) are mounted on a vehicle to control driven members such as current consumers of the vehicle. For example, when a user operates a wiper switch to drive a wiper, a wiper ECU outputs a driving signal to an actuator for driving the wiper. Therefore, the wiper is driven under control of the wiper ECU.

In each ECU having a driving circuit from which a driving current is supplied to a current consumer, a failure sometimes occurs in the driving circuit. For example, when a failure occurs in the driving circuit of an ECU located for outputting a driving current to a current consumer, the ECU cannot control the driving circuit, and the current consumer is not driven normally. To reliably drive the current consumer despite the failure occurring in one driving circuit of the ECU, various techniques have been proposed.

For example, a first patent document (Published Japanese Patent First Publication No. 2004-291943) discloses a technique for driving a wiper motor. In this technique, even when the wiper motor cannot be driven normally under control of a wiper ECU, the wiper motor is driven normally under control of another ECU. More specifically, not only a wiper ECU can control the driving of a wiper according to a control program stored in the wiper ECU, but also an input-output ECU can control the driving of the wiper. This input-output ECU is connected with the wiper ECU through multiple communication lines. In response to a control signal transmitted from the wiper ECU to the input-output ECU through one communication line, the input-output ECU can output electric power to the wiper motor to drive the wiper. Further, other ECUs are connected with one another through the multiple communication lines, and these other ECUs control current consumers other than the wiper.

The wiper ECU judges whether or not a failure occurs in the wiper ECU itself. When the wiper ECU predicts that a failure occurs in the wiper ECU, the wiper ECU transmits a wiper control program stored in the wiper ECU to a backup ECU, this backup ECU stores this program in a non-used area thereof, and the backup ECU performs a wiper control for the wiper. That is, the input-output ECU drives the wiper motor according to a control signal transmitted from the backup ECU.

Further, a second patent document (Published Japanese Patent First Publication No. 2000-148519) discloses a technique for outputting a driving signal to a current consumer through a backup line in response to a failure, occurring in a CPU or a driving circuit located in a driving unit, to drive the current consumer according to the driving signal. More specifically, a multi-communication system has a control unit for outputting data corresponding to user's operation to a communication line, a driving unit with a CPU and a driving circuit for receiving data from the communication line, generating a driving current in the driving circuit according to the data, outputting the driving current to a current consumer to drive the consumer, and an option unit connected with the driving unit through a backup line. The option unit can transmit a driving signal to the current consumer through the backup line to directly drive the current consumer. The option unit monitors the operation of the driving unit. When the option unit detects a failure occurring in the driving unit, the option unit fetches data transmitted from the control unit to the driving unit, generates a driving current in a backup driving circuit according to the data, and outputs the driving current to the current consumer corresponding to the driving unit. Therefore, the option unit directly drives the current consumer through the backup line.

In recent years, the number of ECUs and the number of current consumers mounted on a vehicle have been increased, each ECU controls a single current consumer or a plurality of current consumers, and the ECUs perform data communication with one another through multiple communication lines. Therefore, a system for controlling a plurality of ECUs connected with one another through communication lines is generally located in a vehicle.

When the technique disclosed in the first or second patent document is applied to this control system, one normally-operated ECU can control a current consumer instead of a failed ECU adapted to control the consumer. However, when the technique disclosed in the first patent document is applied to the control system, it is required to additionally provide an input-output ECU for each of ECUs located in the system or to provide an input-output ECU which can receive a control signal from each ECU and can control all current consumers adapted to be controlled by the ECUs. As a result, as the number of ECUs is increased in a vehicle, the size and cost of the control system are considerably increased. Further, as the number of ECUs adapted to transmit control programs to backup ECUs is increased, the volume of a storing area for storing the programs in the backup ECUs is undesirably increased, and the memory capacity and the processing load in the backup ECUs are increased. Therefore, it is not proper to apply the technique disclosed in the first patent document to the control system.

Further, when the technique disclosed in the second patent document is applied to the control system, a plurality of current consumers are controlled normally by ECUs and are controlled by one of backup ECUs in response to a failure occurring in one of the ECUs. In this situation, as the number of current consumers is increased, it is required to increase the number of backup driving circuits and the number of backup lines. Further, the configuration of the option unit is complicated, the size of the option unit is enlarged, and the manufacturing cost of the option unit is increased.

SUMMARY OF THE INVENTION

A main object of the present invention is to provide, with due consideration to the drawbacks of the conventional control system, a control system, having a plurality of ECUs connected with one another through a communication line, which reliably controls the driving of any current consumers, controlled normally by the ECUs, at low cost with a limited resource required of the system even when a failure occurs in one ECU so as to fail in controlling the driving of the current consumer.

Further, a subordinate object of the present invention is to provide an ECU used for the control system.

According to a first aspect of this invention, the object is achieved by the provision of a control system comprising a plurality of regular electronic control units that control a plurality of driven members, respectively, to drive each of the driven members, and a backup electronic control unit that controls each driven member instead of the regular electronic control unit controlling the driven member in response to a failure state occurring in the regular electronic control unit. Each of the regular electronic control units comprises a regular driver, a failure judging block, and a failure information outputting block. The regular driver supplies a driving output based on the driving method to the corresponding driven member to drive the driven member. The failure judging block judges whether or not the regular electronic control unit is in a failure state such that the regular driver fails in supplying the driving output to the corresponding driven member, and sets failure information, indicating a failure state occurring in the regular electronic control unit, when the regular electronic control unit is in the failure state. The failure information outputting block outputs the failure information. The backup electronic control unit comprises an output driver, a connect ion changing block, an information receiving block, and a driving output control block. The output driver can produce a driving output based on the driving method so as to drive any of the driven members receiving the driving output. The connection changing block can change a connection of the output driver to connect the output driver to any of the driven members and to supply the driving output of the output driver to the driven member connected to the driven member. The information receiving block can receive the failure information from the failure information outputting block of any of the regular electronic control units. In response to the failure information outputted from the failure information outputting block of one regular electronic control unit and received in the information receiving block, the driving output control block controls the connection changing block to connect the output driver to the driven member corresponding to the regular electronic control unit, and controls the output driver to produce the driving output and to supply the driving output of the output driver to the driven member connected to the output driver.

With this structure of the control system, each regular electronic control units controls the driving of one driven member by supplying a driving output from the regular driver to the driven member. When one of the regular electronic control units is in a failure state, the failure judging block sets failure information, and the failure information outputting block outputs the failure information to the information receiving block of the backup electronic control unit. In response to the reception of this failure information, the backup electronic control unit is operated. That is, the driving output control block controls the connection changing block connects the output driver to the driven member corresponding to the regular electronic control unit, and controls the output driver to produce the driving output and to supply the driving output of the output driver to the driven member connected to the output driver.

Because any of the plurality of driven members can receive the driving output produced in one output driver under control of the driving output control block, the control system does not need a plurality of output drivers of which the number is equal to the number of driven members, but the number of output drivers can be lessened. Especially, the control system having only one output driver can control the driving of any driven members instead of the regular electronic control unit being in the failure state.

Accordingly, even when any of the regular electronic control units is in the failure state, the control system having only one output driver in the backup electronic control unit can reliably supply a driving current from the output driver to the current consumer corresponding to the regular electronic control unit instead of the regular electronic control unit at low cost by using a limited resource for the control system.

According to a second aspect of this invention, the object is achieved by the provision of an electronic control unit used as one of the regular electronic control units of the control system. The control system can be manufactured by using this electronic control unit.

According to a third aspect of this invention, the object is achieved by the provision of an electronic control unit used as the backup electronic control unit of the control system. The control system can be manufactured by using this electronic control unit.

BRIEF DESCRIPTION OF THE DRAWINGS

FIG. 4 shows safety levels of output channels, according to the first embodiment;

FIG. 7 shows safety levels of output channels according to the second embodiment of the present invention;

FIG. 8 shows a value of safety level of each output channel and numerical values prepared for each output channel relating to priority relating information according to the third embodiment of the present invention;

DETAILED DESCRIPTION OF THE PREFERRED EMBODIMENTS

Figure 1:
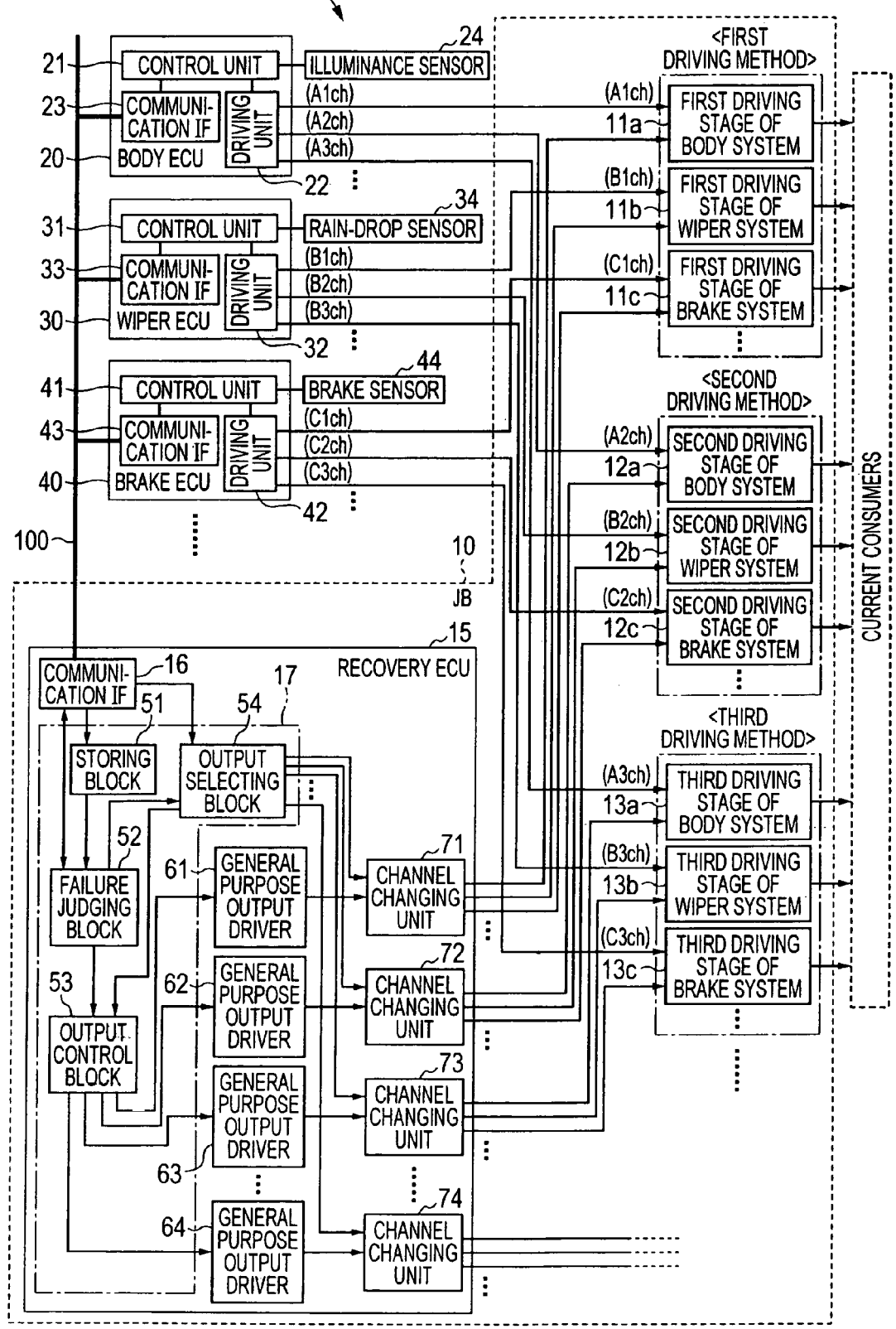
FIG. 1 is a block diagram of a control system having a plurality of regular ECUs and a recovery ECU according to first to third embodiments of the present invention.

Embodiments of the present invention will now be described with reference to the accompanying drawings, in which like reference numerals indicate like parts, members or elements throughout the specification unless otherwise indicated.

First Embodiment

FIG. 1 is a block diagram of a control system according to the first embodiment. As shown in FIG. 1, a control system 1 is mounted on a vehicle and has a plurality of regular electronic control units (hereinafter, called regular ECUs) connected with one another through a communication line 100. Each regular ECU is connected with a plurality of current consumers (i.e., driven members) through respective output channels and respective driving stages and controls the driving of each current consumer when the regular ECU is not set in a failure state.

The consumers controlled by the regular ECUs are classified into a plurality of groups. The current consumers in each group can be driven by a driving method peculiar to the group. Each regular ECU controls the driving of current consumers driven by various driving methods. The driving method of each current consumer connected with one regular ECU through one output channel is expressed by a channel specification of the output channel. This channel specification is indicated by a carried current value, a current-carrying timing or the like. For example, each of current consumers classified as one group is driven in response to the supply of a driving current having a specific value which is set based on one driving method. In contrast, each of current consumers classified as another group is driven in response to the supply of a specific pulse width modulation (PWM) driving current which is set based on another driving method.

For example, the control system 1 has a body ECU 20, a wiper ECU 30 and a brake ECU 40 as regular ECUs. Each regular ECU can perform data communication with the other regular ECUs.

The body ECU 20 controls first current consumers of various types, drivable by different driving methods in a body system of the vehicle, to drive each of these consumers such as a door lock motor and headlights (not shown). To control these consumers, the body ECU 20 has a control unit (acting as a failure judging block and a failure information outputting block) 21, a driving unit 22, and a communication interface 23. The communication interface 23 transmits and receives data in accordance with a predetermined communication protocol. The control unit 21 receives a detection signal indicating a request for the driving of one current consumer from each of various sensors such as an illuminance sensor 24, and receives an input signal indicating a request for the driving of one current consumer from one of various switches which is operated by a user. Each time the control unit 21 receives one request from one detection or input signal, the unit 21 produces a driving instruction for one current consumer. In accordance with each driving instruction, the driving unit 22 generates a driving current and outputs the driving current to the corresponding current consumer.

The driving unit 22 has a driving circuit (hereinafter, called a driver) for each of the current consumers drivable under control of the ECU 20. An output channel is allocated to each consumer. Therefore, the drivers of the driving unit 22 correspond to respective output channels. For example, the output channel of the driving current outputted from the driver to the door lock motor is set at an A1 channel. The output channel of the driving current outputted from the driver to the headlights is set at an A2 channel. Output channels of driving currents outputted from the driver to other consumers are set at respective channels such as an A3 channel.

For example, when a user operates a switch to lock doors, the control unit 21 outputs a driving instruction, instructing the driving of the door lock motor, to the driving unit 22. In response to this instruction, the driver of the driving unit 22 corresponding to the door lock motor produces a driving current (i.e., a driving output) based on the driving method matching with the type of the door lock motor and outputs this driving current to the door lock motor through the A1 channel. Therefore, the doors are locked. Further, when a user operates a switch to switch on the headlights, the control unit 21 outputs a driving instruction, instructing the lighting of the headlights, to the driving unit 22. In response to this instruction, the driver of the driving unit 22 corresponding to the headlights produces a driving current (i.e., a driving output) based on the driving method matching with the type of the headlights and outputs this driving current to the headlights through the A2 channel. Therefore, the headlights are lighted on.

The driving current of each output channel is sent to one of driving stages located in a junction box (JB) 10 and is received in the corresponding current consumer. The junction box 10 denotes a well-known relay box in which electrical components such as relays and fuses are densely located. Electric power or a signal passes through electrical components of the junction box 10 and is sent to the corresponding consumer. Each of the driving stages in the junction box 10 denotes an electrical component such as a relay or a fuse or a wire relay component such as a bus bar.

With this structure of the body ECU 20, when the control unit 21 receives a request for the driving of a current consumer from a switch operated by the user or a sensor, the control unit 21 outputs a driving instruction to the driver of the driving unit 22 corresponding to the current consumer. In response to this driving instruction, the driver supplies a driving current to the current consumer through the junction box 10, and the current consumer is driven by the driving output.

For example, the driving current outputted from the driver of the driving unit 22 corresponding to the A1 channel (i.e., the driving output from the A1 channel) is sent to a first driving stage 11a of the body system in the junction box 10 to drive the door lock motor. This driving stage 11a is formed of a relay for door lock. Therefore, when the driving current is received in the driving stage 11a, the door lock relay is turned on, and the driving current is supplied to the door lock motor through the relay.

The driving current outputted from the driver of the driving unit 22 corresponding to the A2 channel (i.e., the driving output from the A2 channel) is sent to a second driving stage 12a of the body system in the junction box 10 to drive the headlights. This driving stage 12a is formed of a wire relay component such as a bus bar. Therefore, when the driving current is received in the driving stage 12a, the driving current is supplied to the headlights through the relay component.

The driving current outputted from the driver of the driving unit 22 corresponding to the A3 channel (i.e., the driving output from the A3 channel) is sent to a third driving stage 13a of the body system in the junction box 10, and the driving current is supplied to a corresponding current consumer through the driving stage 13a.

In this embodiment, at least the A1, A2 and A3 channels among the output channels of the body ECU 20 correspond to driving methods different from one another. For example, the driving output from the A1 channel corresponds to a first driving method, the driving output from the A2 channel corresponds to a second driving method, and the driving output from the A3 channel corresponds to a third driving method.

Further, the body ECU 20 has an output failure detecting function to detect whether or not each of the drivers of the driving unit 22 normally outputs a driving current through the corresponding output channel to drive one current consumer. In other words, the body ECU 20 detects whether or not each current consumer drivable by the corresponding driving method is driven normally. More specifically, after the control unit 21 outputs a driving instruction to one driver of the driving unit 22, the control unit 21 judges whether or not the driver normally outputs a driving current through the corresponding output channel in response to the driving instruction to drive the corresponding current consumer. When the control unit 21 detects that the driver does not normally output a driving current or no driving current is outputted from the driver, the control unit 21 judges that an output failure such as a failure of a semiconductor switch composing the driver or the like occurs in the driver, and the control unit 21 outputs failure information to the communication line 100. This failure information indicates that the driver is set in a failure state. In other words, the failure information indicates that the output channel of the driver has failed.

The wiper ECU 30 controls second current consumers of various types, drivable by different driving methods in a wiper system of the vehicle, to drive each of these consumers such as a wiper motor (not shown). In the same manner as the ECU 20, the ECU 30 has a control unit (acting as a failure judging block and a failure information outputting block) 31, a driving unit 32, and a communication interface 33. To drive these consumers containing the wiper motor, the driving unit 32 has a driver for each consumer, and one output channel is allocated for each driver. For example, the output channel of the driving current, outputted from the driver for driving the wiper motor, is set at a B1 channel. Output channels of driving currents outputted from other drivers to current consumers are set at respective channels such as a B2 channel and a B3 channel.

The control unit 31 can receive detection signals transmitted from sensors such as a raindrop sensor 34, detecting rainfall on the outside of the vehicle, and input signals transmitted from various switches, operated by a user, through the communication interface 33. When receiving one detection or input signal, the control unit 31 produces a driving instruction which instructs one driver corresponding to the received signal to output a driving current. For example, when a user operates a switch to drive a wiper, the control unit 31 outputs a driving instruction to the driver of the driving unit 32 corresponding to the wiper motor. In response to this instruction, the driver outputs a driving current to the junction box 10 through the B1 channel corresponding to the wiper motor. Further, any of other drivers of the driving unit 32 can output a driving current to the junction box 10 through one output channel. Each driving current is supplied to the corresponding current consumer through the corresponding driving stage of the junction box 10.

For example, the driving current outputted from one driver of the driving unit 32 through the B1 channel (i.e., the driving output from the B1 channel) is sent to a first driving stage 11*b* of the wiper system in the junction box 10 to drive the wiper motor. This driving stage 11*b* is formed of a relay for the wiper. Therefore, when the driving current is received in the driving stage 11*b*, the wiper relay is turned on, and the driving current is supplied to the wiper motor through the relay.

The driving currents of other channels such as the B2 channel and the B3 channel in the driving unit 32 are sent to respective driving stages such as a second driving stage 12*b* and a third driving stage 13*b* of the wiper system in the junction box 10, and the driving currents are supplied to corresponding current consumers through these driving stages.

In this embodiment, at least the B1, B2 and B3 channels among the output channels of the wiper ECU 30 correspond to driving methods different from one another. For example, the driving output of the B1 channel corresponds to the first driving method, the driving output of the B2 channel corresponds to the second driving method, and the driving output of the B3 channel corresponds to the third driving method.

Further, the wiper ECU 30 has an output failure detecting function to detect whether or not each of the drivers of the driving unit 32 normally outputs a driving current through the corresponding output channel to drive one current consumer. In other words, the wiper ECU 30 detects whether or not each current consumer drivable by the corresponding driving method is driven normally. When the control unit 31 detects that one driver does not normally output a driving current or does not output any driving current in response to a driving instruction of the unit 31, the control unit 31 judges that an output failure occurs in the driver, and the control unit 31 outputs failure information to the communication line 100. This failure information indicates that the driver is set in a failure state. In other words, the failure information indicates that the output channel of the driver is failed.

The brake ECU 40 controls third current consumers of various types, drivable by different driving methods in a brake system of the vehicle, to drive each of these consumers such as stop lamps (not shown). In the same manner as the ECU 20, the ECU 40 has a control unit (acting as a failure judging block and a failure information outputting block) 41, a driving unit 42, and a communication interface 43. To drive these consumers containing the stop lamps, the driving unit 32 has a driver for each consumer, and one output channel is allocated for each driver. For example, the output channel of the driving current, outputted from the driver for lighting on the stop lamps, is set at a C2 channel. Output channels of driving currents outputted from other drivers to current consumers are set at respective channels such as a C1 channel and a C3 channel.

The control unit 41 can receive detection signals transmitted from sensors and input signals transmitted from various switches such as a brake pedal 44, operated by a user, through the communication interface 43. The control unit 41 produces a driving instruction from one received detection or input. For example, when a user pushes the brake pedal 44 to decelerate or stop the vehicle, the control unit 41 outputs a driving instruction to the driving unit 42. In response to this instruction, the driver corresponding to the stop lamps outputs a driving current to the junction box 10 through the C2 channel corresponding to the stop lamps. Therefore, the stop lamps are switched on. Further, driving currents outputted from other drivers of the driving unit 42 can be sent to the junction box 10 through other channels. Each driving current is supplied to the corresponding current consumer through the corresponding driving stage of the junction box 10.

For example, the driving current outputted from one driver of the driving unit 42 through the C2 channel (i.e., the driving output from the C2 channel) is sent to a second driving stage 12*c* of the brake system in the junction box 10 to light on the stop lamps. This driving stage 12*c* is formed of a wire relay component such as a bus bar. Therefore, when the driving current is received in the driving stage 12*c*, the driving current is supplied to the stop lamps through the wire relay component. The driving outputs of other channels such as the C1 channel and the C3 channel in the driving unit 42 are sent to respective driving stages such as a first driving stage 11*c* and a third driving stage 13*c* of the brake system in the junction box 10, and the driving currents are supplied to corresponding current consumers through these driving stages.

In this embodiment, at least the C1, C2 and C3 channels among the output channels of the brake ECU 40 correspond to driving methods different from one another. For example, the driving current of the C1 channel corresponds to the first driving method, the driving current of the C2 channel corresponds to the second driving method, and the driving current of the C3 channel corresponds to the third driving method.

Further, the brake ECU 40 has an output failure detecting function to detect whether or not each of the drivers of the driving unit 42 normally outputs a driving current through the corresponding output channel to drive one current consumer. In other words, the brake ECU 40 detects whether or not each current consumer drivable by the corresponding driving method is driven normally. When the control unit 41 detects that one driver does not normally output a driving current or does not output any driving current in response to a driving instruction of the unit 41, the control unit 41 judges that an output failure occurs in the driver, and the control unit 41 outputs failure information to the communication line 100. This failure information indicates that the driver is set in a failure state. In other words, the failure information indicates that the output channel of the driver is failed.

In this embodiment, at least three output channels (the A1, A2 and A3 channels) are allocated to each of the ECU 20, the ECU 30 and the ECU 40, and the driving methods corresponding to these output channels (i.e., channel specifications of the output channels) differ from one another. However, the number of output channels corresponding to each ECU, the number of types of current consumers driven under control of each ECU and the number of driving methods of the consumers can be arbitrarily set.

The control system 1 has a single recovery ECU 15 (or a backup ECU 15) located in the junction box 10 in addition to the regular ECUs such as the regular ECUs 20, 30 and 40. This recovery ECU 15 is connected with the regular ECUs through the communication line 100 to perform data communication with each of the regular ECUs. More specifically, when the recovery ECU 15 receives failure information indicating an output failure occurring in one driver (or one output channel) of one regular ECU, the recovery ECU 15 performs the substitute driving of the current consumer corresponding to the failed driver (or the failed channel) of the failed regular ECU to supply a driving current (i.e., a driving output) to the current consumer instead of the failed driver of the failed regular ECU.

The regular ECUs and the recovery ECU 15 perform data communication with one another through the communication line 100 by transmitting communication frames prepared according to a communication protocol based on a well-known multi-master type such as CSMA/CD (carrier sense multiple access with collision detection) type superior in response. This CSMA/CD is well known in the same manner as CAN (controller area network).

The communication line 100 is set at one of two levels such as a dominant level and a recessive level in the same manner as CAN. The dominant level corresponds to the bit value "0", and the recessive level corresponds to the bit value "1". The dominant level has priority over the recessive level. Therefore, when at least one of a plurality of nodes (i.e., the regular ECUs and the recovery ECU 15) connected with the communication line 100 outputs the bit value of the dominant level to the communication line 100, the communication line 100 is set at the dominant level.

The recovery ECU 15 can control the driving of each of the current consumers which are controlled normally by the regular ECUs including the ECUs 20, 30 and 40. When an output failure occurs in one driver of the regular ECUs such as the ECU 20, the ECU 30 or the ECU 40 which normally supplies a driving current to a specific current consumer, the failed regular ECU cannot control this specific current consumer.

Therefore, in response to the failure information sent from the failed regular ECU, the recovery ECU 15 performs the substitute driving of the specific current consumer as a backup ECU instead of the failed regular ECU.

The recovery ECU 15 has a communication interface (acting as an information receiving block) 16, a control unit (acting as a driving output control block and a first priority judging block) 17, a plurality of general purpose output drivers 61, 62, 63, . . . and 64 corresponding to the respective driving methods, and a plurality of channel changing units 71, 72, 73, . . . and 74 corresponding to the respective driving methods. The changing unit corresponding to each driving method acts as an output changing block of the claims.

The interface 16 fundamentally has the same structure as those of the interfaces 23, 33 and 43 to receive and transmit data from/to each of the regular ECUs through the communication line 100 according to the communication protocol. Each of the output drivers 61, 62, 63, . . . and 64 can produce a driving current based on the corresponding driving method. Each of the changing units 71, 72, 73, and 74 is connected with one output driver corresponding to the same detecting method as the detecting method of the changing unit. Each changing unit 71, 72, 73, . . . or 74 corresponding to one detecting method can perform the channel change to select one of output channels, through which the electric consumers drivable by the detecting method are connected with the changing unit, and to supply a driving current of the corresponding output driver 61, 62, 63, . . . or 64 to the current consumer through the selected output channel.

When the ECU 15 receives failure information (e.g., a failure informing frame) indicating an output failure occurring in one output channel of one regular ECU, from the communication line 100 through the interface 16, the control unit 17 specifies the driving method corresponding to the failed output channel of the failed regular ECU from registration information, which indicates the relation between each output channel of each regular ECU and one driving method corresponding to the output channel. The current consumer connected with the failed regular ECU through the failed output channel is drivable by the specified driving method. The control unit 17 controls the output driver corresponding to the specified driving method to produce a driving current based on the specified driving method, and controls the changing unit corresponding to the specified driving method to select one output channel through which the current consumer connected with the failed regular ECU through the failed output channel is also connected with the changing unit. Therefore, instead of the failed regular ECU, the recovery ECU 15 performs the substitute driving to supply the driving current, produced in the output driver based on the specified driving method, to the current consumer, connected with the failed regular ECU through the failed output channel, through the selected output channel of the ECU 15 and the driving stage corresponding to the failed output channel of the failed regular ECU.

More specifically, for example, when the control unit 17 specifies the first driving method corresponding to one failed channel of one failed ECU (e.g., the body ECU 20), the changing unit 71 corresponding to the first driving method selects one output channel connected with one of the first driving stages 11*a*, 11*b*, 11*c*, - - - (e.g., the first driving stage 11*a* corresponding to the body ECU 20) corresponding to the first driving method and the failed channel of the failed ECU and outputs the driving current of the output driver 61 corresponding to the first driving method to the selected output channel to supply the driving current to the current consumer, drivable by the first driving method, through the corresponding first driving stage.

When the control unit 17 specifies the second driving method corresponding to one failed channel of one failed ECU, the changing unit 72 corresponding to the second driving method selects one output channel connected with one of the second driving stages 12a, 12b, 12c, - - - corresponding to the second driving method and the failed channel of the failed ECU, and outputs the driving current of the output driver 62 corresponding to the second driving method to the selected output channel to supply the driving current to the current consumer, drivable by the second driving method, through the corresponding second driving stage.

When the control unit 17 specifies the third driving method corresponding to one failed channel of one failed ECU, the changing unit 73 corresponding to the third driving method selects one output channel connected with one of the third driving stages 13a, 13b, 13c, - - - corresponding to the third driving method and the failed channel of the failed ECU and outputs the driving current of the output driver 63 corresponding to the third driving method to the selected output channel to supply the driving current to the current consumer, drivable by the third driving method, through the corresponding third driving stage.

When the control unit 17 specifies the N-th (N is a natural number equal to or higher than four) driving method corresponding to one failed channel of one failed ECU, the N-th changing unit 74 corresponding to the N-th driving method selects one output channel connected with one of the N-th driving stages corresponding to the N-th driving method and the failed channel of the failed ECU and outputs the driving current of the output driver 64 corresponding to the N-th driving method to the selected output channel to supply the driving current to the current consumer, drivable by the N-th driving method, through the corresponding N-th driving stage.

Each of the changing units 71, 72, 73, . . . and 74 (e.g., the unit 71) has a plurality of output ports, respectively, connected with the driving stages (e.g., the first driving stages 11a, 11b, 11c, - - -) of the corresponding driving method (e.g., the first driving method), selects one output port corresponding to the failed ECU (e.g., the body ECU 20) specified by the control unit 17 from the output ports, and outputs the driving current received from the corresponding general purpose output driver (e.g., the driver 61) to the driving stage (e.g., the first driving stage 11a), connected with the selected output port, through the selected output port.

Assuming that the recovery ECU 15 has a plurality of drivers, of which the number is equal to the number of driving stages (i.e., the number of current consumers) in one driving method, for each driving method so as to connect each driver with one driving stage of the corresponding driving method, the configuration of the recovery ECU 15 is complicated, and the size of the recovery ECU 15 is enlarged. Especially, as the number of current consumers drivable by one driving method is increased, the configuration of the recovery ECU 15 is further complicated, the size of the recovery ECU 15 is further enlarged, and the manufacturing cost of the control system 1 is increased.

However, in this embodiment, the recovery ECU 15 has only one general purpose output driver for each driving method, and the changing unit corresponding to each general purpose output driver outputs the driving current produced in the general purpose output driver to one of the driving stages of the driving method corresponding to the general purpose output driver. Therefore, even when the ECU 15 controls the driving of a large number of current consumers drivable by one driving method, the ECU 15 requires only one output driver and only one changing unit. Accordingly, the control system 1 can have a simplified configuration, be set in a small size, and manufactured at low cost.

The control unit 17 is made of an integrated circuit such as a flash microcomputer. The control unit 17 has a storing block 51, a failure judging block 52, an output control block 53, and an output selecting block 54.

The storing block 51 stores channel-specification information indicating the relation between each of the output channels of one regular ECU and the channel specification (i.e., the driving method) of the output channel for each regular ECU. To store this channel-specification information about the regular ECUs in the block 51, an external tool is, for example, connected with the communication line 100 before the control system 1 is mounted on the vehicle, and a file of registration frames indicating the channel-specification information about the regular ECUs is transmitted from the external tool to the block 51 of the recovery ECU 15. Alternatively, each regular ECU transmits a file of registration frames indicating the channel-specification information about the regular ECU to the block 51.

Figure 2:
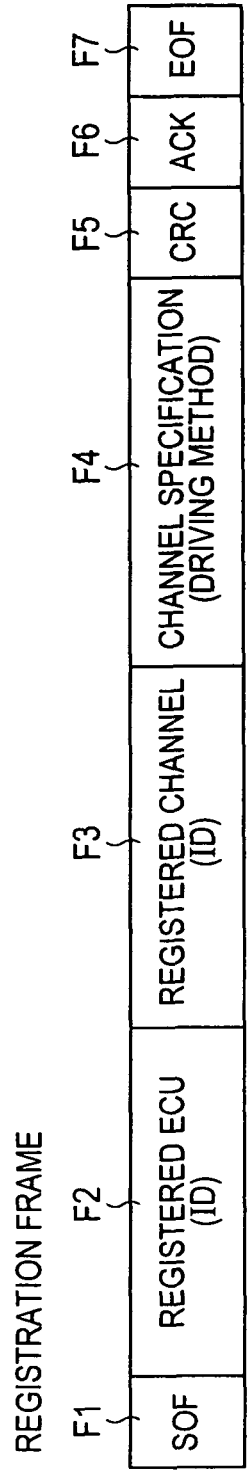
FIG. 2 is an explanatory view showing a registration frame of channel-specification information indicating relation between an output channel and a channel specification.

FIG. 2 is an explanatory view of one registration frame indicating the channel-specification information. As shown in FIG. 2, one registration frame has an SOF (start of frame) field F1, a registered ECU field F2, a registered channel field F3, a channel specification field F4, a CRC (cyclic redundancy check) field F5, an ACK (acknowledge) field F6 and an EOF (end of frame) field F7 arranged in that order. This frame is transmitted through the communication line 100 according to the communication protocol based on the multi-master type such as CSMA/CD type.

Data indicating the start of this frame is written in the SOF field F1 to synchronize with the ECU 15. Data indicating the end of this frame is written in the EOF field F7. The CRC field F5 is used to detect transmission error occurring in this registration. The ACK field F6 is used for the transmitter of the frame to judge whether or not the frame is normally received in the receiver. The transmitter transmits the registration frame, having the ACK field F6 originally set at the bit value "1" indicating the recessive level, to the communication line 100. When normally receiving this frame without any error, the ECU 15 denoting the receiver sets the ACK field F6 at the bit value "0" indicating the dominant level and returns the frame having the ACK field F6 set at the bit value "0" to the communication line 100. Therefore, the ECU 15 can respond to the transmitter of the registration frame that the frame is successfully received, and the transmitter can confirm that the receiver successfully receives the frame.

The registered ECU field F2 is used to transmit an identification of the regular ECU to be registered. For example, in case of the registration of the body ECU 20, the identification number of "0101" is written in the field F2. In case of the registration of the wiper ECU 30, the identification number of "0010" is written in the field F2. The regular ECUs have different identification numbers.

The registered channel field F3 is used to transmit an identification of the output channel to be registered. For example, in case of the registration of the A2 channel, the identification number of "00010010" is written in the field F3. In case of the registration of the B3 channel, the identification number of "00110001" is written in the field F3. The output channels are identified by different numbers.

The channel specification field F4 is used to transmit an identification of the channel specification (i.e., the driving method) of the output channel to be registered. For example, incase of the registration of the first driving method, the identification number of "00010100" is written in the field F4 as an identification of the channel specification. The driving methods are identified by different numbers.

Therefore, the storing block 51 can store the identifications of one regular ECU, one output channel and one channel specification associated with one another for each output channel of each regular ECU as the channel-specification information about the regular ECUs.

Figure 3A:
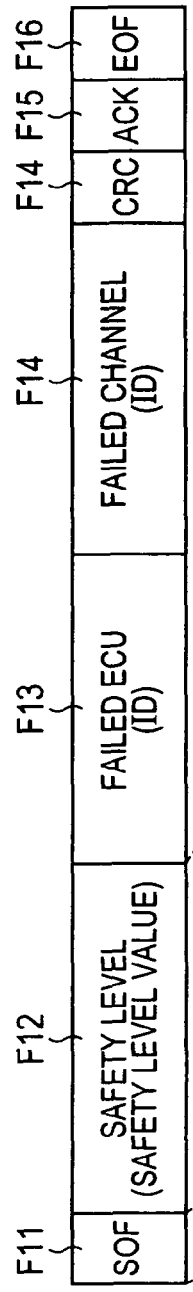
FIG. 3A is an explanatory view showing a failure informing frame according to the first embodiment.

Further, each of the regular ECUs such as the ECUs 20, 30 and 40 has the output failure detecting function as described above. When an output failure occurs in one regular ECU, this ECU outputs a failure informing frame (i.e., failure information) to the recovery ECU 15 through the communication line 100. FIG. 3A is an explanatory view of a failure informing frame. As shown in FIG. 3A, a failure informing frame outputted from one failed ECU has an SOF field F11, a safety level field F12, a failed ECU field F13, a failed channel field F14, a CRC field F15, an ACK field F16 and an EOF field F17 arranged in that order. The fields F11, F15, F16 and F17 act in the same manner as the fields F1, F5, F6 and F7 of the registration frame shown in FIG. 2. This frame is transmitted through the communication line 100 according to the communication protocol based on the multi-master type such as CSMA/CD type.

In the field F13, an identification number of one regular ECU, in which an output failure occurs, is written. This ECU is called a failed ECU. One identification number is allocated to each regular ECU so as to be commonly used for the failure informing frame and the registration frame. Therefore, when the identification number of the failed ECU written in the field F13 is the same as the identification number of the regular ECU written in the field F2, the regular ECUs in the frames are the same.

In the field F14, an identification number of the output channel corresponding to the driver, in which an output failure occurs, is written. This output channel is called a failed channel. One identification number is allocated to each output channel so as to be commonly used for the failure informing frame and the registration frame. Therefore, when the identification number of the failed channel written in the field F14 is the same as the identification number of the output channel written in the field F3, the channels in the frames are the same.

In the safety level field F12, a safety level (i.e., priority information) of the failed channel is written in the filed F14. The safety level of each output channel indicates priority given to the output channel (i.e., priority given to the current consumer corresponding to the output channel) in the driving of the current consumer. Because types of output failures occurring in the respective output channels differ from one another, the safety level is preset for each type of output failure. The safety level of each output channel is expressed by a value peculiar to the type of output failure occurring in the output channel. This value is called a safety level value (i.e., a priority level or a first priority level). The value of the safety level of each output channel is lowered as the priority given to the output channel (or the safety level of the output channel) is heightened. The safety level of each output channel of each regular ECU is stored in a memory of the regular ECU in advance. When one output channel of one regular ECU is failed, the control unit of the regular ECU reads out the safety level of this output channel from the memory and writes this safety level in the failure informing frame of the failed channel.

When output failures simultaneously occurs in respective output channels, regular ECUs of the output channels simultaneously transmit failure informing frames to the communication line 100. Because these frames are prepared according to the communication protocol based on the multi-master type such as CSMA/CD type, as described later in detail, the frames are sent to the recovery ECU 15 one after another in the order of increasing the safety level value (i.e., in the order of decreasing the safety level). Therefore, the recovery ECU 15 can perform the substitute driving for the failed channels according to the priority of the failed channels.

FIG. 4 shows safety levels of output channels depending on types of output failures occurring in the output channels. As shown in FIG. 4, a door lock failure occurs in the A1 channel of the body ECU 20 as a type of output failure. Even when this door lock failure is continued so as to drive the vehicle without locking the doors, the vehicle can be driven without losing safety so much. Therefore, low priority is given to the A1 channel of the body ECU 20, and the A1 channel is set at a low safety level. In contrast, a stop lamp failure occurs in the C2 channel of the brake ECU 40 as another type of output failure. When the vehicle is driven with the stop lamps inoperative in response to user's braking operation, it is dangerous to continue driving the vehicle. Therefore, high priority is given to the C2 channel of the brake ECU 40, and the C2 channel is set at a high safety level.

In this embodiment, as the safety level is heightened, the safety level value set in the field F12 is lowered. When a plurality of regular ECUs simultaneously output failure informing frames to the transmission line 100, collision of the frames occurs on the line 100. In this case, these regular ECUs perform arbitration to transmit only one failure informing frame, selected from among the failure informing frames, to the recovery ECU 15. In this arbitration, the safety level values set in the frames are compared with one another, and one failure informing frame having the lowest safety level value (i.e., the highest safety level) is selected and is transmitted to the recovery ECU 15. After the reception of the frame having the lowest safety level value in the recovery ECU 15, the recovery ECU 15 receives the other failure informing frames one by one in the order of increasing the safety level value (i.e., in the order of decreasing the safety level).

Figure 3B:
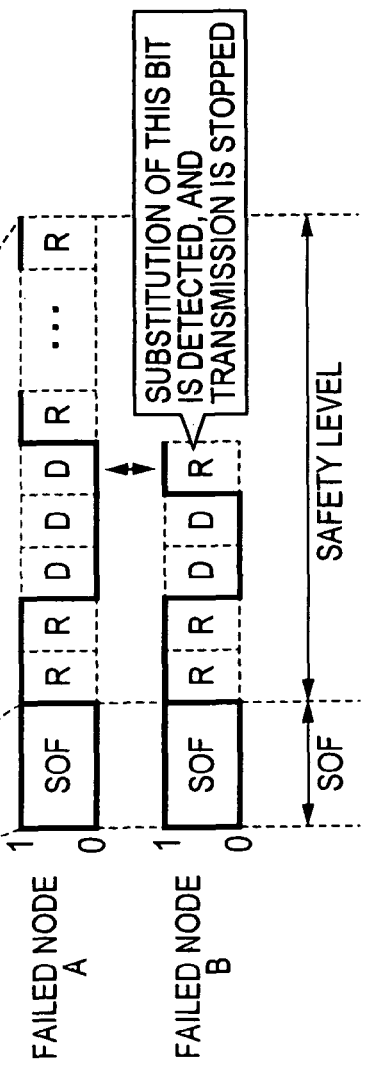
FIG. 3B shows arbitration, performed to select one failure informing frame in case of collision of failure informing frames, according to the first embodiment.

FIG. 3B shows arbitration performed to select one failure informing frame incase of collision of failure informing frames. As shown in FIG. 3B, for example, two failed nodes A and B denoting two failed ECUs simultaneously outputs failure informing frames, respectively. The failed nodes can acknowledge the frame collision from the comparison of data of the SOF fields F11 of the frames with each other. The safety level value of each frame is composed of a series of bits, and each failed node outputs the bits of the safety level value one by one. In this situation, each failed node compares the level of one bit, just outputted from this failed node to the line 100, with the level set on the line 100 (i.e., the level of one bit just outputted from the other failed node to the line 100) for each bit of the safety level value. When levels of both bits are the same, each failed node continues the transmission of the safety level value. In contrast, when levels of both bits differ from each other such that the level of one bit just outputted from one failed node is recessive (i.e., bit value "1") while the level set on the line 100 is dominant (i.e., bit value "0"), this failed node knows that the safety level of the output channel of this failed node causing a type of output failure is low, and stops outputting the failure informing frame. Therefore, the other failed node continues outputting the failure informing frame to the line 100, and the recovery ECU 15 receives this frame. After the reception of the frame in the recovery ECU 15, the failed node stopping the transmission of the frame again outputs the frame to the line 10, and the recovery ECU 15 finally receives the frame outputted from this failed node. In the example shown in FIG. 3B, the fifth bit of the safety level value in the failed node B is recessive while the fifth bit of the safety level value in the failed node A is dominant. Therefore, the failed node B stops outputting the failure informing frame.

Each time the recovery ECU 15 receives one failure informing frame, the ECU 15 confirms the failed ECU and the failed channel written in the fields F13 and F14 of the frame, and specifies the channel specification (i.e., the driving method) associated with the failed channel of the failed ECU by referring to the registration frame. In this registration frame, the identification number of the registered ECU which is the same as the identification number of the failed ECU of the failure informing frame is written, and the identification number of the registered channel which is the same as the identification number of the failed channel of the failure informing frame is written. Then, the ECU 15 outputs a driving current, produced based on the specified driving method, to one current consumer through the driving stage connected with the current consumer. Therefore, the ECU 15 can control the driving of the current consumer instead of the failed ECU.

Because the ECU 15 has the storing block 51 storing the channel-specification information in advance, in response to the reception of one failure informing frame, the ECU 15 collates contents of the failure informing frame with the channel-specification information to specify the driving method corresponding to the failed channel, determines the general purpose output driver corresponding to the specified driving method to produce a driving current in the determined driver, and outputs this driving current to the failed channel.

More specifically, when the communication interface 16 of the ECU 15 receives one failure informing frame through the communication line 100, the failure judging block 52 of the control unit 17 receives this failure informing frame, and reads out a specific registration frame corresponding to the failure informing frame from the storing block 51. The identification numbers of the registered ECU and the registered channel written in this specific registration frame are the same as the identification numbers of the failed ECU and the failed channel written in the failure informing frame. The judging block 52 specifies the driving method written in the specific registration frame, outputs information about the failed ECU and the failed channel written in the failure informing frame to the output selecting block 54, and outputs information about the specified driving method to the output control block 53. For example, when the B1 channel of the wiper ECU 30 is failed, the failure judging block 52 refers to the registration frame corresponding to the wiper ECU 30 and the B1 channel, and specifies the first driving method written in the field F4 of the registration frame.

The output control block 53 determines the general purpose output driver corresponding to the driving method specified by the judging block 52 and controls the determined output driver to produce a driving current based on the specified driving method. The output selecting block 54 selects the driving stage corresponding to the failed ECU and the failed channel, and controls the changing unit corresponding to the specified driving method to output the driving current of the determined output driver to the output channel connected with the selected driving stage. Therefore, the driving current of the output driver corresponding to the specified driving method is supplied to the driving stage corresponding to the failed ECU and the failed channel, and the current consumer planned to be driven under control of the failed ECU is driven by the driving current under control of the recovery ECU 15 instead of the failed ECU. For example, when the driver of the B1 channel of the wiper ECU 30 is failed, the block 53 determines the output driver 61, the selecting block 54 selects the first driving stage 11b of the wiper system, and the changing unit 71 outputs the driving current of the determined output driver 61 to the output channel connected with the first driving stage 11b. The driving current produced in the driver 61 is supplied to the current consumer through the first driving stage 11b.

Further, each time the recovery ECU 15 receives one failure informing frame, the output selecting block 54 receives the safety level of the output channel written in this frame as the failed channel, from the communication interface 16. During the substitute driving for a first failed channel performed by the ECU 15 in response to the first failure informing frame corresponding to one driving method, the ECU 15 sometimes receives the second failure informing frame of a second failed channel corresponding to the same driving method as the driving method of the first failed channel. In this case, the block 54 compares the safety level of the second failed channel written in the second failure informing frame with the safety level of the first failed channel written in the first failure informing frame. When the safety level of the first failed channel is higher than the safety level of the second failed channel, the ECU 15 continues the substitute driving for the first failed channel. In contrast, when the safety level of the second failed channel is higher than the safety level of the first failed channel, the ECU 15 stops the placed driving for the first failed channel, and the ECU 15 starts the substitute driving for the second failed channel.

Therefore, even when the recovery ECU 15 successively receives a plurality of failure informing frames corresponding to the same driving method so as to inform the ECU 15 that the ECU 15 should perform the substitute driving of a plurality of current consumers drivable by the same driving method, the ECU 15 can drive these current consumers, corresponding to the failed channels of the failed ECUs written in the received failure informing frames, one after another in the order of decreasing the safety level (i.e., according to the priority of the failed channels).

When a plurality of output channels corresponding to different driving methods are failed, the judging block 52 specifies the driving methods corresponding to the failed channels, and each of a plurality of general purpose output drivers corresponding to the respective specified driving methods produces a driving current, and each of a plurality of channel connection changing blocks corresponding to the respective specified driving methods connects the corresponding output driver to the current consumer corresponding to the failed channel of the failed ECU. Therefore, even when a plurality of output channels corresponding to different driving methods simultaneously fail, the current consumers drivable by the different driving methods can be simultaneously driven under control of the ECU 15 instead of the failed ECUs.

Figure 5:
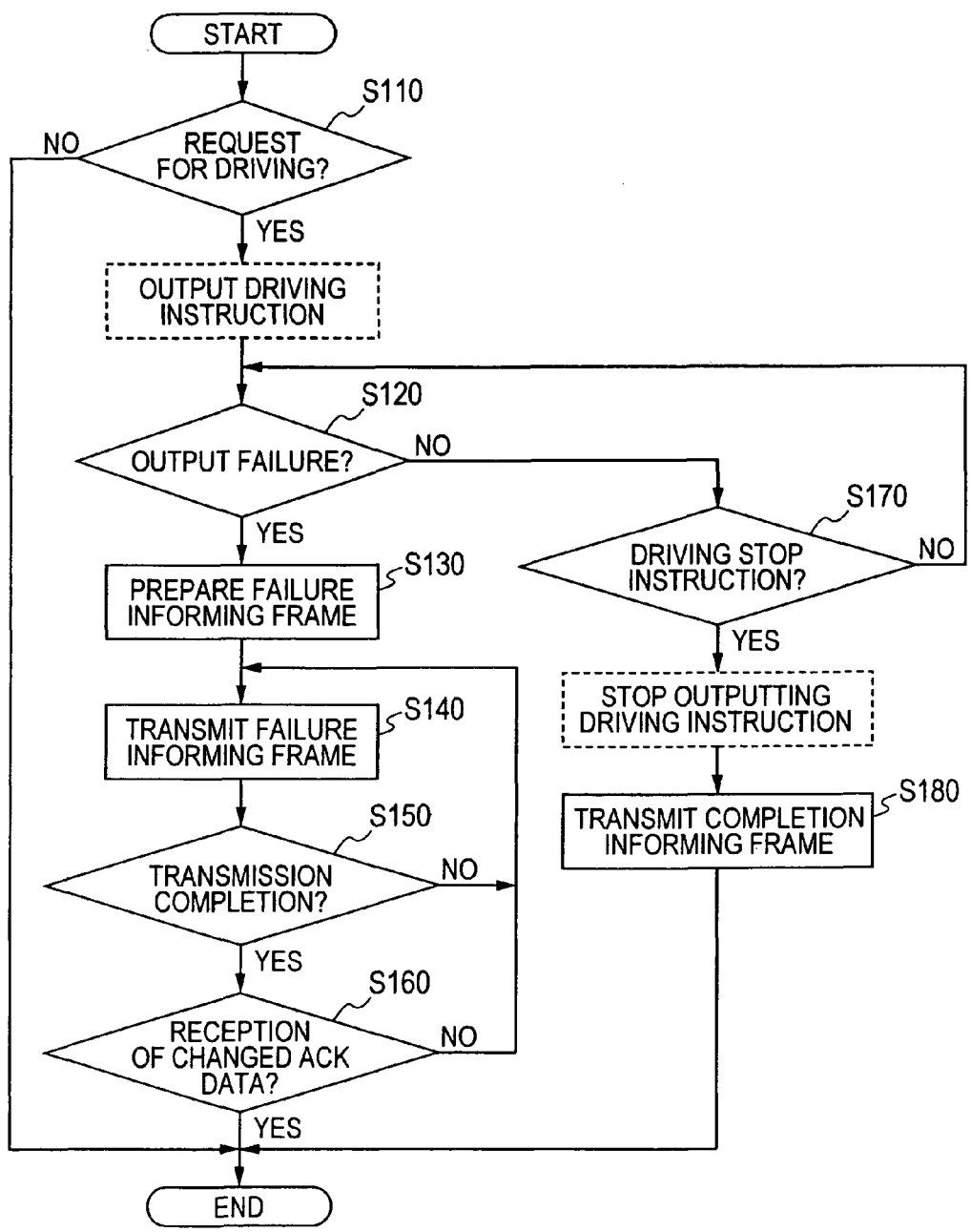
FIG. 5 is a flow chart of a failure informing process performed in each regular ECU shown in FIG. 1.

Next, a failure informing process performed in each of the control units 21, 31, 41, - - - of the regular ECUs 20, 30, 40, - - - will be described in detail with reference to FIG. 5. FIG. 5 is a flowchart of the failure informing process. The control unit of each regular ECU periodically performs the failure informing process shown in FIG. 5 at equal periods of time. Further, the control units of the regular ECUs can simultaneously perform the failure informing process. Moreover, the control unit of each regular ECU can simultaneously perform failure informing processes for the respective drivers of the regular ECU. In this embodiment, the failure informing process performed for one driver of one regular ECU will be described.

As shown in FIG. 5, at step S110, the control unit of one regular ECU judges whether or not the control unit receives a request for the driving of one current consumer from a user or a sensor. When no request is received (NO at step S110), this failure informing process is ended. In contrast, when the control unit receives a request for the driving of the current consumer corresponding to one driver of the driving unit of this regular ECU (YES at step S110), the control unit continuously outputs a driving instruction to the driver to instruct the driver to continuously output a driving current to the current consumer.

Then, at step S120, the control unit judges whether or not the driver normally outputs a driving current to the current consumer in response to the driving instruction. In other words, the control unit judges whether or not an output failure occurs in the driver.

When no output failure occurs in the driver (NO at step S120), the driver of this regular ECU continuously outputs a driving current to the current consumer, and the current consumer is driven. Then, at step S170, the control unit judges whether or not the control unit receives a driving stop instruction for the current consumer from the user or one sensor. This driving stop instruction is an input signal indicating a stoppage of the driving of the current consumer currently driven. When no driving stop instruction is received (NO at step S170), the procedure returns to step S120. Therefore, the driver continues outputting the driving current to the consumer in response to the driving instruction.

In contrast, when the control unit receives a driving stop instruction for the current consumer currently driven (YES at step S170), the control unit stops outputting the driving instruction to the driver. Therefore, the supply of the driving current from the driver to the current consumer is stopped, and the driving of the current consumer is ended. Then, at step S180, the control unit transmits a completion informing frame to the communication line 100. Then, the control unit stops this failure informing process. In this completion informing frame, the identification number of the regular ECU, the identification number of the output channel corresponding to the driver and the channel specification of the output channel are written. Therefore, an external device can confirm the completion of the driving of the current consumer.

In contrast, when the control unit judges that an output failure occurs in the driver (YES at step S120), the driver of this regular ECU fails to output a driving current to the current consumer, so that the regular ECU cannot drive the current consumer. Therefore, at step S130, the control unit prepares a failure informing frame (see FIG. 3) in which the regular ECU and the channel corresponding to the driver are written as a failed ECU and a failed channel. In this preparation, the control unit receives the identification number of the failed ECU, the identification number of the failed channel and the value of the safety level of the failed channel from a memory of the regular ECU, and prepares the frame from the received numbers and the received safety level. Then, at step S140, the control unit transmits the prepared failure informing frame to the communication line 100 bit by bit.

Thereafter, at step S150, the control unit judges whether or not the transmission of the prepared failure informing frame is completed. In other words, in the case of the arbitration between the prepared failure informing frame and another failure informing frame, the control unit judges whether or not the prepared failure informing frame is selected in the arbitration so as to be received in the recovery ECU 15. When the transmission of the prepared failure informing frame is not completed because of no selection of the prepared failure informing frame in the arbitration (NO at step S150), the procedure returns to step S140, and the control unit again transmits the prepared failure informing frame to the communication line 100. Therefore, the control unit repeatedly transmits the prepared failure informing frame to the communication line 100 bit by bit until the transmission of the prepared failure informing frame is completed.

When the transmission of the prepared failure informing frame is completed because of the selection of this frame in the arbitration (YES at step S150), at step S160, the control unit judges whether or not ACK data of the ACK field F16 returned from the recovery ECU 15 to the transmission line 100 is changed to the bit value "0" indicating the dominant level. When the ECU 15 successfully receives the prepared failure informing frame through the communication line 100, the ECU 15 changes the bit value "1" written in the ACK field F16 of the frame to the bit value "0".

When the control unit does not receive ACK data of the ACK field F16 changed to the bit value "0" (NO at step S160), the procedure returns to step S140, and the control unit again transmits the prepared failure informing frame to the communication line 100. In contrast, when the control unit receives ACK data of the ACK field F16 changed to the bit value "0" (YES at step S160), the control unit confirms that the failure informing frame prepared in the control unit is successfully received in the ECU 15. Then, the control unit ends this process. Therefore, the driving of the current consumer failed in the regular ECU can be performed in the ECU 15.

Figure 6:
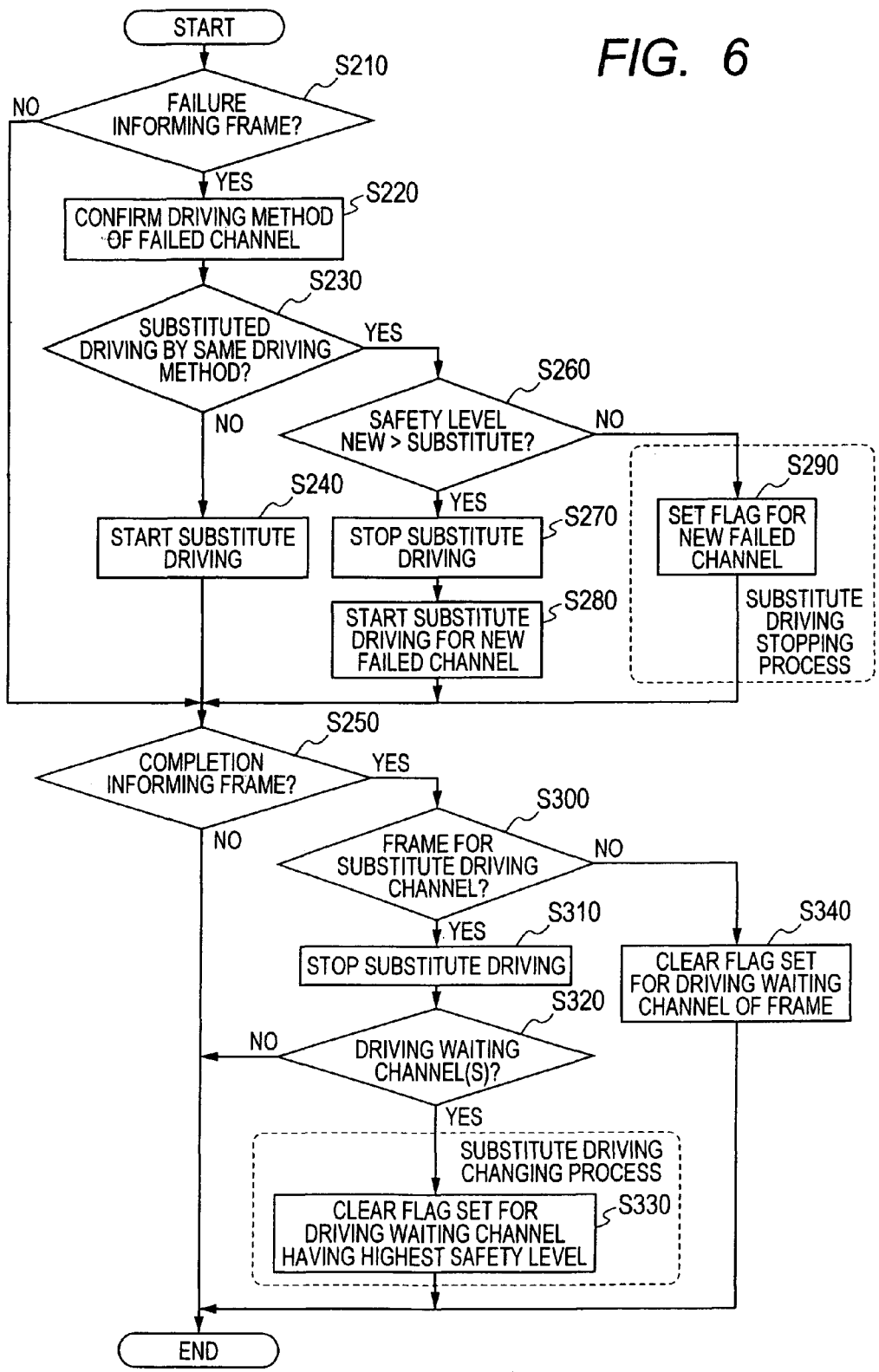
FIG. 6 is a flow chart of a substitute driving process performed in the recovery ECU instead of one failed ECU.

A driving process performed in the control unit 17 of the recovery ECU 15 instead of one failed ECU will be described in detail with reference to FIG. 6. FIG. 6 is a flow chart of the driving process. The process (hereinafter, called a substitute driving process) shown in FIG. 6 is periodically performed at equal periods of time under control of the control unit 17.

As shown in FIG. 6, at step S210, the control unit 17 judges whether or not the ECU 15 receives one failure informing frame through the communication line 100. When no frame is received (NO at step S210), there is no new failed channel. Therefore, the procedure proceeds to step S250. At step S250, the control unit 17 judges whether or not the ECU 15 receives a completion informing frame for one output channel of one regular ECU from the regular ECU through the communication line 100. When the ECU 15 receives no completion informing frame, the control unit 17 ends this substitute driving process.

One completion informing frame for one output channel is transmitted from one regular ECU corresponding to the output channel when this regular ECU receives a driving stop instruction for the current consumer of the output channel from the user or one sensor. The regular ECU transmits this completion informing frame to the communication line 100 regardless of whether or not an output failure occurs in the driver of the regular ECU corresponding to the output channel so as to fail in stopping the driving of the current consumer in response to the driving stop instruction. This driving stop instruction is an input signal indicating a stoppage of the driving of the current consumer currently driven. In this completion informing frame, the identification number of the regular ECU, the identification number of the output channel and the channel specification of the output channel are written.

In contrast, when the ECU 15 receives one failure informing frame (refer to FIG. 3 and step S140 shown in FIG. 5) corresponding to one failed channel (called a new failed channel) of one failed ECU (YES at step S210), it is required that the ECU 15 perform the substitute driving to drive the current consumer of the failed channel instead of the failed ECU. Therefore, at step S220, the control unit 17 confirms the driving method of the failed channel written in the frame. Then, at step S230, the control unit 17 judges whether or not the ECU 15 now performs the substitute driving for one failed channel (called a substitute driving channel) by the same driving method as the driving method of the new failed channel.

When no substitute driving is performed in the ECU 15, or when the driving method in the substitute driving for the substitute driving channel is not the same as the driving method of the new failed channel (NO at step S230), the ECU 15 can perform the substitute driving for the new failed channel while performing the substitute driving for the substitute driving channel. Therefore, at step S240, the ECU 15 immediately starts the substitute driving for the new failed channel to supply a driving current to the current consumer of the new failed channel. In this substitute driving, the general purpose output driver corresponding to the driving method of the new failed channel is operated to produce a driving current, and the changing unit corresponding to this driver outputs the driving current of the driver to the output channel connected with the driving stage corresponding to the new failed channel. This new failed channel is set as a substitute driving channel. Then, the procedure proceeds to step S250.

In contrast, when the ECU 15 now performs the substitute driving for the substitute driving channel by the same driving method as the driving method of the new failed channel (YES at step S230), the ECU 15 cannot simultaneously perform both the substitute driving for the substitute driving channel and the substitute driving for the new failed channel. Therefore, at step S260, the ECU 15 compares the safety level of the new failed channel and the safety level of the substitute driving channel and judges whether or not the safety level of the new failed channel is higher than the safety level of the substitute driving channel. When the safety level of the new failed channel is higher than the safety level of the substitute driving channel (YES at step S260), there is priority of the substitute driving for the new failed channel to the substitute driving for the substitute driving channel.

Therefore, at step S270, the control unit 17 stops the substitute driving for the substitute driving channel, and sets a waiting flag for the substitute driving channel. Although the control unit 17 has already received the failure informing frame for this substitute driving channel, the control unit 17 stops the substitute driving for this channel until the waiting flag set for the channel is cleared. This substitute driving channel is called a driving waiting channel. Then, at step S280, the control unit 17 starts the substitute driving for the new failed channel to supply the driving current to another current consumer corresponding to the new failed channel, and this new failed channel is set as a substitute driving channel. Then, the procedure proceeds to step S250.

In contrast, when the safety level of the new failed channel is not higher than the safety level of the substitute driving channel (NO at step S260), the substitute driving for the substitute driving channel takes priority over the substitute driving for the new failed channel. Therefore, at step S290, the control unit 17 performs a substitute driving stopping process required when the ECU 15 cannot perform the substitute driving for the new failed channel. Then, the procedure proceeds to step S250. In this process at step S290, a waiting flag is set for the new failed channel, and this new failed channel is set as a driving waiting channel.

At step S250, when the ECU 15 receives one completion informing frame during the substitute driving of the ECU 15 (YES at step S250), at step S300, the control unit 17 judges whether or not the output channel written in this completion informing frame accords with one of substitute driving channels for which the ECU 15 now performs the substitute driving. In the case of the affirmative judgment at step S300, the control unit 17 judges that the ECU 15 should stop the substitute driving for the substitute driving channel because the regular ECU corresponding to the substitute driving channel fails in stopping the driving of the current consumer of the substitute driving channel. Therefore, at step S310, the control unit 17 stops the substitute driving for the substitute driving channel.

Thereafter, at step S320, the control unit 17 judges whether or not at least one driving waiting channel drivable by the same driving method as the driving method of the substitute driving channel, for which the substitute driving is stopped, exists. This driving waiting channel can be set at step S270 or step S290. When there is no driving waiting channel (NO at step S320), it is not required to perform the substitute driving for any output channel drivable by the same driving method as the driving method of the substitute driving channel for which the substitute driving is stopped. Therefore, this substitute driving process is completed.

In contrast, in the case of the affirmative judgment at step S320, at step S330, the control unit 17 performs a substitute driving changing process. Then, this substitute driving changing process is completed. In this substitute driving changing process at step S330, the control unit 17 selects one driving waiting channel having the highest safety level among the driving waiting channels drivable by the same driving method as the driving method of the substitute driving channel for which the substitute driving is stopped, clears the waiting flag set for the selected driving waiting channel to set this channel as a substitute driving channel, and starts the substitute driving for this substitute driving channel. Then, this selection is repeated until the substitute driving for all driving waiting channels is completed. Therefore, the current supply to current consumers corresponding to the driving waiting channels can be performed according to priority.

In contrast, when the output channel written in the completion informing frame differs from any substitute driving channel for which the ECU 15 now performs the substitute driving (NO at step S300), at step S340, when the driving waiting channel which is the same as the output channel written in the completion informing frame exists, the control unit 17 clears the waiting flag set for the driving waiting channel. Then, this substitute driving process is completed.

Because the waiting flag set for the driving waiting channel is cleared, the substitute driving for this channel is not performed at step S330 in any substitute driving process following this substitute driving process. Therefore, the substitute driving for the driving waiting channel with no waiting flag can be substantially stopped in response to the completion informing frame.

As described above, the control system 1 has the recovery ECU 15. Therefore, when one driver of one regular ECU planned to produce and output a driving current to one current consumer is failed, the system 1 can reliably perform the substitute driving of this current consumer.

Further, the ECU 15 does not have any driver for each driving stage corresponding to one current consumer, but has only one general purpose output driver for each driving method. Therefore, each general purpose output driver can produce a current driving current based on one driving method to supply this current to each of a plurality of current consumers drivable by this driving method. Accordingly, even when an output failure occurs in a driver of any regular ECU corresponding to one output channel, the system 1 can reliably supply a driving current to the current consumer of the output channel instead of the regular ECU at low cost by using a limited resource for the system 1.

Moreover, each time an output failure occurs in an output channel of one regular ECU, this regular ECU outputs a failure informing frame in which the safety level indicating the priority of the output channel in the driving is written in the frame. Therefore, even when the recovery ECU 15 receives failure informing frame of a new failed channel during the substitute driving for a substitute driving channel corresponding to the same driving method as the driving method of the new failed channel, the ECU 15 can judge which channel has a higher priority according to the safety levels of the new failed channel and the substitute driving channel. Accordingly, the control system 1 can reliably control the driving of the new failed channel and the substitute driving channel according to the priority of the failed channels.

Further, the failure informing frame is prepared according to the communication protocol based on the multi-master type such as CSMA/CD type. Therefore, even when a plurality of output channels corresponding to the same driving method are simultaneously failed, the recovery ECU 15 can receive the failure informing frames from the communication line 100 one after another in the order of decreasing the safety level. Accordingly, the control system 1 can reliably control the driving of the output channels simultaneously failed according to the priority of the failed channels.

Second Embodiment

In the first embodiment, the safety level of each output channel is set at a fixed value. However, there are specific output channels of which the priority in the driving is changeable in dependent on specific circumstances and/or conditions of the vehicle such as rain, brightness and the like on the outside of the vehicle. These circumstances and/or conditions of the vehicle relating to the specific output channels are detected by sensors, or the user operates switches in response to the circumstances and/or conditions of the vehicle.

For example, the body ECU 20 receives a detection signal indicating a brightness level on the outside of the vehicle from the illuminance sensor 24 (see FIG. 1). When an output failure occurs in the driver corresponding to the headlights, the recovery ECU 15 performs the substitute driving of the headlights instead of the body ECU 20. In this case, the priority of the output channel corresponding to the headlights in the driving depends on the brightness level on the outside of the vehicle. More specifically, the priority of the output channel corresponding to the headlights is low in the daytime, and the necessity of the substitute driving of the headlights is low. In contrast, the priority of the output channel corresponding to the headlights is high at night or when the vehicle is running in a dark place such as a tunnel, and it is strongly required to perform the substitute driving of the headlights.

Further, the wiper ECU 30 receives a detection signal, indicating the existence of rainfall on the outside of the vehicle, from the raindrop sensor 34 (see FIG. 1). When an output failure occurs in the driver corresponding to the wiper motor, the recovery ECU 15 performs the substitute driving of the wiper motor instead of the wiper ECU 30. In this case, the priority of the output channel corresponding to the wiper motor depends on the existence of rainfall on the outside of the vehicle. More specifically, the priority of the output channel corresponding to the wiper motor is low when the sensor 34 detects no rainfall, while the priority of the output channel corresponding to the wiper motor is high when the sensor 34 detects rainfall.

Therefore, in this embodiment, specific output channels of which the priority depends on circumstances and/or conditions of the vehicle are specified in advance. Each of specific sensors detects the circumstances and/or conditions of the vehicle as a detection signal, and the user operates each of specific switches in response to the circumstances and/or conditions of the vehicle so as to output an input signal from the switch. Information indicated by each of these detection and input signals is called priority relating information (or failure relating information). Each priority relating information relates to one specific output channel (i.e., one current consumer). A plurality of safety level values (i.e., priority levels) of the safety level corresponding to respective kinds of contents of priority relating information are prepared in advance for each specific output channel. These safety level values of each specific output channel are stored in a memory of the corresponding regular ECU. In response to the reception of priority relating information in the control unit of each regular ECU, the safety level of one specific output channel of the regular ECU is set at one safety level value corresponding to contents of the priority relating information.

FIG. 7 shows safety levels of the output channels according to the second embodiment. As shown in FIG. 7, the safety level of each output channel is set at one of the values "0", "A", "B" and "C". The safety level of the value "0" is lowest, and the safety level of the value "C" is highest. Further, the safety level of each of specific output channels (e.g., the B1 channel and C2 channel) is changeable in dependent on a detection or input signal of a sensor or switch. A plurality of safety level values are prepared for each specific output channel. For example, because the A2 channel corresponding to the headlights relates to priority relating information sent from the sensor 24, the safety level of the value "A" is prepared for the A2 channel in case of the priority relating information indicating high brightness, and the safety level of the value "B" is prepared for the A2 channel in case of the priority relating information indicating darkness. Further, because the B1 channel corresponding to the wiper motor relates to priority relating information sent from the sensor 34, the safety level of the value "0" is prepared for the B1 channel in case of the priority relating information indicating no rainfall, and the safety level of the value "C" is prepared for the B1 channel in case of the priority relating information indicating rainfall.

The hardware configuration of the control system 1 according to the second embodiment is the same as that shown in FIG. 1.

Each of the regular ECUs such as the ECUs 20, 30 and 40 prepares a failure informing frame (refer to step S130 of FIG. 5). When one output channel, of which the safety level relates to priority relating information, is failed, the control unit of the regular ECU sets the safety level of the output channel at one safety level value corresponding to contents of the priority relating information just received in the regular ECU, and writes the safety level of the safety level value in the failure informing frame (i.e., failure information).

For example, when the priority relating information sent from the sensor 24 indicates high brightness, the A2 channel is set at the low safety level of "A". In contrast, when the priority relating information sent from the sensor 24 indicates darkness, the A2 channel is set at the high safety level of "B". Further, when the priority relating information sent from the sensor 34 indicates no rain drop, the B1 channel is set at the lowest safety level of "0". In contrast, when the priority relating information sent from the sensor 34 indicates rainfall, the B1 channel is set at the highest safety level of "C".

Therefore, in this embodiment, the safety level of each output channel relating to or influenced by priority relating information is not fixed but is changeable. A plurality of safety level values are prepared as candidates for the safety level of each output channel relating to priority relating information, and the safety level of the output channel is set at one safety level value according to contents of the priority relating information just received in the corresponding regular ECU. Accordingly, the safety level of each output channel can be appropriately set while considering circumstances and/or conditions of the vehicle relating to the output channel, and the recovery ECU 15 can appropriately perform the substitute driving of a plurality of current consumers according to the priority of the output channels corresponding to the consumers.

Third Embodiment

In the first embodiment, when safety levels of a plurality of failed channels corresponding to the same driving method are set at the same value, the recovery ECU 15 cannot determine the order of the failed channels in the substitute driving according to the priority of the failed channels. Further, as described in the second embodiment, the priority of specific output channels in the driving is changeable in dependent on circumstances and/or conditions of the vehicle.

Therefore, in the third embodiment, the safety level of each output channel is set according to a type of output failures occurring in the output channel in the same manner as in the first embodiment, each of specific output channels of which the priority is influenced by circumstances and/or conditions of the vehicle is associated with priority relating information in the same manner as in the second embodiment, and a plurality of priority related numerical values corresponding to respective kinds of contents of priority relating information are prepared for each specific output channel relating to the priority relating information. The numerical value of each specific output channel is lowered as the priority given to the specific output channel is heightened. These numerical values prepared for each specific output channel are stored with the value of the safety level of the specific output channel in a memory of the corresponding regular ECU. Each specific output channel of each regular ECU relating to priority relating information is set at one numerical value (i.e., a second priority level) corresponding to contents of the priority relating information just received in the control unit of the regular ECU. The priority of each specific output channel is indicated by both the safety level and the priority related numerical value.

FIG. 8 shows a value of the safety level of each output channel and numerical values prepared for each output channel relating to priority relating information according to the third embodiment. As shown in FIG. 8, the safety level of the A1 channel of the body ECU 20 is set at "middle", and the safety level of the B1 channel of the wiper ECU 30 is set at "middle". Therefore, the A1 channel and the B1 channel corresponding to the same first driving method are set at the same safety level.

Further, because the B1 channel corresponding to the wiper motor relates to priority relating information sent from the sensor 34, two numerical values corresponding to kinds of contents of the priority relating information are prepared for the B1 channel. In case of the priority relating information of "rainfall", the B1 channel is set at the priority related numerical value of "00- - - 000" denoting high priority. In contrast, in case of the priority relating information of "no rainfall", the B1 channel is set at the priority related numerical value of "00- - - 011" denoting low priority. In the same manner, because the A2 channel corresponding to the headlights relates to priority relating information sent from the sensor 24, two numerical values corresponding to kinds of contents of the priority relating information are prepared for the A2 channel. The priority related numerical value of the A2 channel is set at "00- - - 010" in case of the priority relating information of "high brightness level", and is set at "00- - - 001" in case of the priority relating information of "darkness".

Although there is no priority relating information relating to the A1 channel corresponding to the door lock motor and the C2 channel corresponding to the stop lamps, the A1 channel is set at a priority related numerical value "00- - - 010" corresponding to the safety level of the value "middle" set for the A1 channel, and the C2 channel is set at a priority related numerical value "00- - - 000" corresponding to the safety level of the value "high" set for the C2 channel.

The hardware configuration of the control system 1 according to the third embodiment is the same as that shown in FIG. 1.

Figures 9A, 9B:
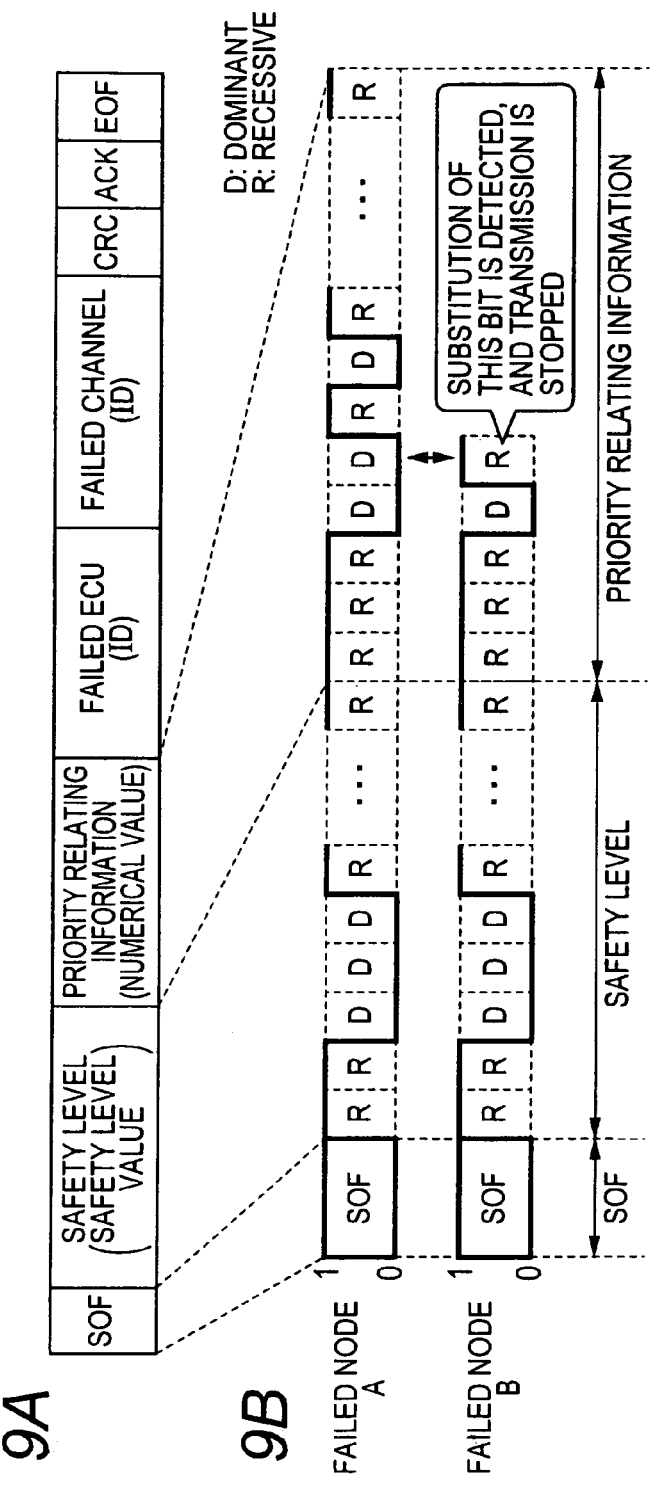
FIG. 9A is an explanatory view showing a failure informing frame according to the third embodiment.
FIG. 9B shows arbitration, performed to select one failure informing frame in case of collision of failure informing frames, according to the third embodiment.

FIG. 9A is an explanatory view showing a failure informing frame according to the third embodiment, while FIG. 9B shows arbitration, performed to select one failure informing frame in case of collision of failure informing frames, according to the third embodiment. When a plurality of output channels corresponding to the same driving method have simultaneously failed, the regular ECUs of the failed channels prepare a plurality of failure informing frames corresponding to the failed channels and transmit these frames to the communication lines 100. Therefore, collision of the frames occurs on the communication line 100, and the regular ECUs perform arbitration to select one of the frames.

As shown in FIG. 9A, in each failure informing frame, the numerical value of priority relating information indicated by a series of bits is written in a field F18 following the field F12 in which the value of the safety level indicated by a series of bits is written. Therefore, each regular ECU can serially and successively transmit a plurality of bits, composing both the value of the safety level and the numerical value of the priority relating information, to the communication line 100. When only one of the failed channels is set at the highest safety level, the arbitration is performed among the regular ECUs in the same manner as in the first embodiment. That is, the failure informing frame corresponding to the failed channel set at the highest safety level is selected in the arbitration before the priority related numerical values of the frames are transmitted to the communication line 100, and the recovery ECU 15 performs the substitute driving for the failed channel of the selected frame. The other regular ECUs other than the regular ECU corresponding to the selected frame again transmit the frames to the communication line 100.

In contrast, when the safety levels of a plurality of failed channels corresponding to the same driving method are set at the same highest value in the frames transmitted to the communication line 100, the regular ECUs fail in the arbitration based on the safety levels of the frame. However, because the failed channels set at the same highest safety level are set at different numerical values of pieces of priority relating information relating to the failed channels, the frame of one channel set at the lowest numerical value is selected in the arbitration based on the numerical values of the pieces of priority relating information, and the recovery ECU 15 performs the substitute driving for the failed channel of the selected frame.

The other regular ECUs other than the regular ECU corresponding to the selected frame again transmit the frames to the communication line 100.

For example, as shown in FIG. 9B, two failed nodes A and B denoting two failed ECUs simultaneously output respective failure informing frames. The failed channels of these frames are set at the same safety level, but the numerical value of the priority relating information in the failed node A is lower than the numerical value of the priority relating information in the failed node B. In this case, each failed node compares the level of one bit, just outputted from this failed node to the line 100, with the level set on the line 100 (i.e., the level of one bit just outputted from the other failed node to the line 100) for each bit of the numerical value of the priority relating information. When levels of both bits are the same, each failed node continues the transmission of the priority relating information. In contrast, when the level of one bit just outputted from the failed node B is recessive while the level set on the line 100 is dominant, this failed node B knows that the priority of the failed channel of the failed node B is low, and stops outputting the failure informing frame. Therefore, the failed node A continues outputting the failure informing frame to the line 100, and the recovery ECU 15 receives this frame.

Accordingly, even when the output channels corresponding to the same driving method are set at the same safety level value and are simultaneously failed, the ECU 15 of the control system 1 can reliably control the driving of the current consumers corresponding to the output channels according to the values of the pieces of priority relating information relating to the failed channels, instead of the regular ECUs of the failed channels.

A substitute driving stopping process and a substitute driving changing process in this substitute driving process performed in the recovery ECU 15 differ from the processes performed at step S290 and step S330 shown in FIG. 6. Therefore, these processes according to the third embodiment will be described.

Figure 10:
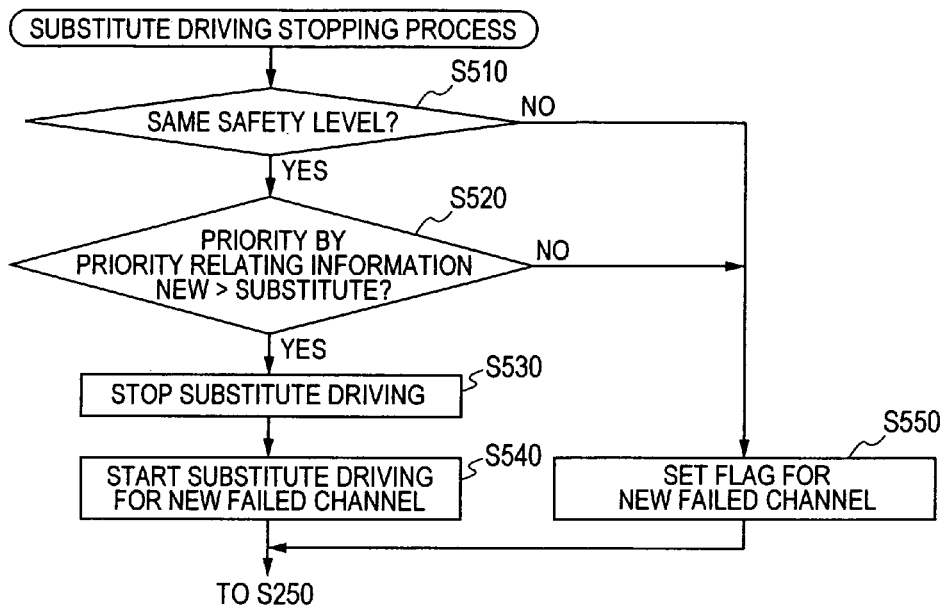
FIG. 10 is a flow chart of a substitute driving stopping process shown in FIG. 6 according to the third embodiment.

FIG. 10 is a flow chart of a substitute driving stopping process performed in the control unit 17 of the recovery ECU 15 according to the third embodiment. When the safety level of the new failed channel is not higher than the safety level of the substitute driving channel (No at step S260 shown in FIG. 6), a substitute driving stopping process shown in FIG. 10 is performed.

In this process, at step S510, the control unit 17 judges whether or not the new failed channel and the substitute driving channel are set at the same safety level. In the case of the negative judgment at step S510, the control unit 17 recognizes that the safety level of the new failed channel is lower than the safety level of the substitute driving channel, and the procedure proceeds to step S550.

In contrast, when the new failed channel and the substitute driving channel are set at the same safety level (YES at step S510), it is impossible to select either the new failed channel or the substitute driving channel according to the priority based on the safety level. Therefore, at step S520, the control unit 17 compares the priority numerical values of the new failed channel and the substitute driving channel with each other and judges whether or not the new failed channel has priority over the substitute driving channel.

When the numerical value of the priority relating information of the new failed channel is lower than the numerical value of the priority relating information of the substitute driving channel, the new failed channel has priority over the substitute driving channel (YES at step S520). In this case, at step S530, the control unit 17 stops the substitute driving for the substitute driving channel, and sets a waiting flag for the substitute driving channel. This substitute driving channel with the flag is called a driving waiting channel, and the substitute driving for this driving waiting channel is prohibited. Then, at step S540, the control unit 17 starts the substitute driving for the new failed channel to supply the driving current to a current consumer corresponding to the new failed channel, and this new failed channel is set as a substitute driving channel during this substitute driving. Then, the procedure proceeds to step S250 shown in FIG. 6.

In contrast, when the numerical value of the priority relating information of the new failed channel is not lower than the numerical value of the priority relating information of the substitute driving channel, the new failed channel has no priority over the substitute driving channel (NO at step S520). In this case, the procedure proceeds to step S550.

At step S550, a waiting flag is set for the new failed channel. This new failed channel with the flag is called a driving waiting channel, and the substitute driving for this driving waiting channel is prohibited. Then, the procedure proceeds to step S250 shown in FIG. 6. Therefore, the substitute driving of the ECU 15 for the substitute driving channel is continued.

Figure 11:
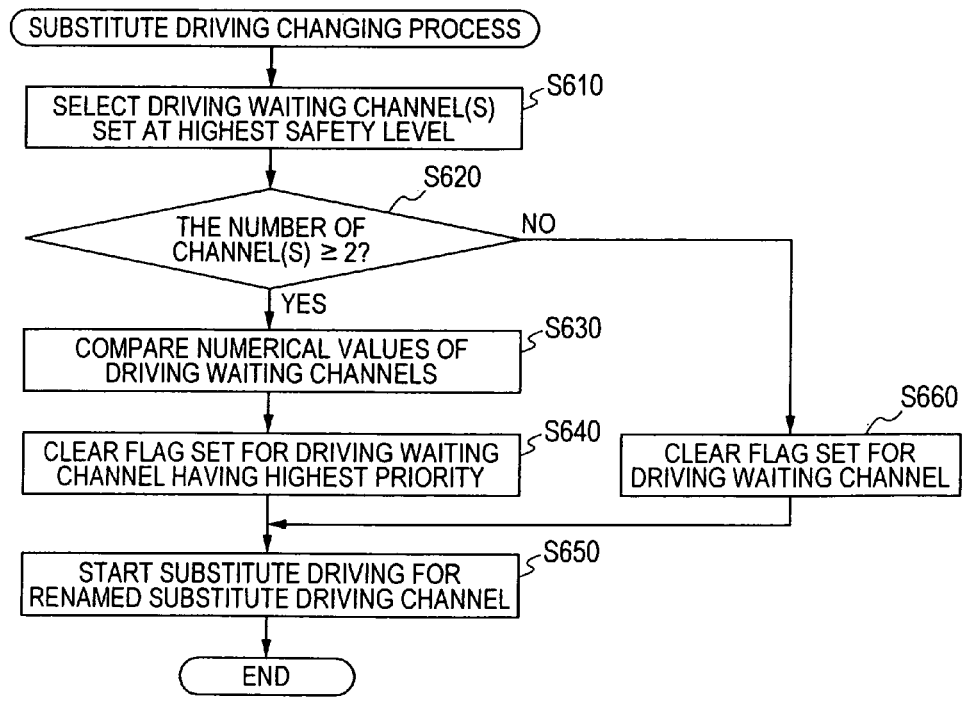
FIG. 11 is a flow chart of a substitute driving changing process shown in FIG. 6 according to the third embodiment.

Next, a substitute driving changing process will be described with reference to FIG. 11. FIG. 11 is a flow chart of a substitute driving changing process performed in the control unit 17 of the recovery ECU 15 according to the third embodiment. When at least one driving waiting channel drivable by the same driving method as the driving method of the substitute driving channel exists (YES at step S320 shown in FIG. 6) after the control unit 17 stops the substitute driving for the substitute driving channel, a substitute driving changing process shown in FIG. 11 is performed.

At step S610, the control unit 17 selects one driving waiting channel or the plurality of driving waiting channels set at the highest safety level from among the driving waiting channel(s). Then, at step S620, the control unit 17 judges whether or not the number of selected driving waiting channels set at the highest safety level is equal to two or more. When only one driving waiting channel set at the highest safety level is selected (NO at step S620), at step S660, the control unit 17 clears the waiting flag set for the selected driving waiting channel to set the selected driving waiting channel as a substitute driving channel. Then, the procedure proceeds to step S650.

In contrast, when the plurality of driving waiting channels set at the highest safety level are selected (YES at step S620), it is impossible to select one of the driving waiting channels set at the highest safety level according to the priority based on the safety level. Therefore, at step S630, the control unit 17 compares the numerical values of pieces of priority relating information written in the failure informing frames of the driving waiting channels with one another. Then, at step S640, the control unit 17 selects one driving waiting channel having the lowest numerical value (i.e., the highest priority) from among the driving waiting channels set at the highest safety level, and clears the waiting flag set for this selected driving waiting channel to set this channel as a substitute driving channel. Then, the procedure proceeds to step S650.

At step S650, the control unit 17 starts the substitute driving for the substitute driving channel newly set, and this process is completed.

As described above, in the third embodiment, the safety level is set for each output channel in the same manner as in the first embodiment, the priority relating information relating to each of specific output channels is defined in the same manner as in the second embodiment, and each regular ECU having at least one specific output channel relating to priority relating information adds a numerical value, corresponding to contents of the priority relating information just received in the regular ECU, to the failure informing frame of the specific output channel so as to indicate the priority of the specific output channel in the driving by both the safety level and the numerical value. Further, each regular ECU additionally sets and writes numerical values of output channels, not relating to any priority relating information, in failure informing frames of the output channels so as to indicate the priority of each output channel by both the safety level and the numerical value.

Therefore, even when a plurality of failure informing frames, in which failed channels corresponding to the same driving method are set at the same safety level, are simultaneously transmitted from regular ECUs to the communication line 100, the regular ECUs can select one failure informing frame corresponding to the lowest numerical value in the arbitration based on the numerical values of the failed channels, because of the frames prepared according to the communication protocol based on the multi-master type such as CSMA/CD type. Accordingly, the control system 1 can reliably control the driving of current consumers of the failed channels, which correspond to the same driving method and are simultaneously failed, according to the priority of the failed channels.

Further, even when the safety level of a new failed channel, of which the failure informing frame is now received in the recovery ECU 15, is the same as the safety level of a substitute driving channel, corresponding to the same driving method as that of the new failed channel, during the substitute driving of the ECU 15 for the substitute driving channel, the ECU 15 can select one failed channel having a higher priority from the new failed channel and the substitute driving channel by comparing the numerical values of the channels with each other, and the ECU 15 can continue or start the substitute driving for the selected channel. Accordingly, the control system 1 can reliably control the driving of current consumers of the failed channels, which correspond to the same driving method and are failed one after another, according to the priority of the failed channels.

MODIFICATIONS

In the embodiments, the recovery ECU 15 has only one output driver for each driving method. However, the ECU 15 may have a plurality of output drivers for each driving method such that the number of output drivers producing driving currents based on each driving method is smaller than the number of current consumers drivable by the driving method. In this case, in response to the failure informing frame informing an output failure occurring in one output channel of one regular ECU corresponding to one driving method, the control unit 17 of the ECU 17 controls the changing unit corresponding to the driving method to output the driving current of one of the output drivers corresponding to the driving method to one output channel connected with the driving stage corresponding to the failed channel. Therefore, the ECU 17 can reliably control the driving of the current consumer corresponding to the failed channel instead of the regular ECU. Further, when it is required to simultaneously perform the substitute driving for a plurality of failed channels having very high priority and corresponding to the same driving method, the control system 1 can simultaneously operate a plurality of output drivers, corresponding to the driving method, of which the number is equal to the number of failed channels, and simultaneously performs the substitute driving for the failed channels. Accordingly, the control system 1 can reliably and appropriately control the driving of a plurality of current consumers drivable by the same driving method, instead of failed regular ECUs.

Further, the safety level of each output channel is expressed by one of three or four safety level values. However, the safety level of each output channel may be expressed by one safety level value selected from five safety level values or more.

Moreover, in the third embodiment, each regular ECU additionally sets and writes numerical values in failure informing frames of output channels not relating to any priority relating information. However, the regular ECU may set no numerical values in failure informing frames of output channels not relating to any priority relating information to write numerical values in failure informing frames of only specific output channels relating to priority relating information.

Furthermore, the recovery ECU 15 is located in the junction box 10. However, the ECU 15 may be located outside the junction box 10.

Furthermore, the driving current of each output driver is supplied to one current consumer through one driving stage of the junction box 10. However, the driving current of each output driver may be directly supplied to one current consumer without passing through any driving stage.

What is claimed is:
1. A control system which controls a plurality of driven members, drivable by a driving method, to drive the driven members by the driving method, comprising:
   a plurality of regular electronic control units that control the respective driven members; and
   a backup electronic control unit that controls each driven member instead of the regular electronic control unit controlling the driven member in response to a failure state occurring in the regular electronic control unit,
   each of the regular electronic control units comprising:
      a regular driver that supplies a driving output based on the driving method to the corresponding driven member to drive the driven member;
      a failure judging block that judges whether or not the regular electronic control unit is in a failure state such that the regular driver fails in supplying the driving output to the corresponding driven member, and sets failure information, indicating a failure state occurring in the regular electronic control unit, when the regular electronic control unit is in the failure state; and
      a failure information outputting block that outputs the failure information,
   the backup electronic control unit comprising:
      an output driver that can produce a driving output based on the driving method so as to drive any of the driven members receiving the driving output;
      an output changing block that can select any of the driven members to output the driving output of the output driver to the selected driven member;
      an information receiving block that can receive the failure information from the failure information outputting block of any of the regular electronic control units; and
      a driving output control block that, in response to the failure information outputted from the failure information outputting block of one regular electronic control unit and received in the information receiving block, controls the output driver to produce the driving output, and controls the output changing block to select the driven member corresponding to the regular electronic control unit and to output the driving output of the output driver to the selected driven member.

2. The control system according to claim 1, wherein
the failure judging block of each regular electronic control unit sets priority information indicating priority of the driven member corresponding to the regular electronic control unit,
the failure information outputting block of the regular electronic control unit outputs the failure information with the priority information,
the information receiving block of the backup electronic control unit receives the failure information with the priority information from each of two failure information outputting blocks or more among the failure information outputting blocks of the regular electronic control units, and
the driving output control block of the backup electronic control unit specifies one regular electronic control unit corresponding to the priority information having a highest priority among the pieces of priority information received in the information receiving block, controls the output driver to produce the driving output, and controls the output changing block to select the driven member corresponding to the specified regular electronic control unit and to output the driving output of the output driver to the selected driven member.

3. The control system according to claim 2, wherein
each regular electronic control unit prepares a plurality of priority levels, corresponding to respective kinds of contents of priority relating information relating to the corresponding driven member, for the priority information, and
the failure judging block of the regular electronic control unit receives priority relating information relating to the driven member and sets the priority information at one of the priority levels corresponding to contents of the received priority relating information.

4. The control system according to claim 2, wherein
the failure judging block of each regular electronic control unit sets a first priority level corresponding to a type of output failure causing the regular electronic control unit in the failure state, receives priority relating information relating to the priority of the corresponding driven member, sets a second priority level corresponding to the priority relating information, expresses the priority information by the first and second priority levels, and
the driving output control block of the backup electronic control unit specifies one regular electronic control unit corresponding to the priority information having a highest first priority level among the pieces of priority information received in the information receiving block when only one piece of priority information received in the information receiving block has the highest first priority level, specifies one regular electronic control unit corresponding to the priority information having a highest second priority level among the pieces of priority information received in the information receiving block when the first priority levels of two pieces of priority information or more received in the information receiving block are the same, controls the output driver to produce the driving output, and controls the output changing block to select the driven member corresponding to the specified regular electronic control unit and to output the driving output of the output driver to the selected driven member.

5. The control system according to claim 4, wherein the failure judging block of each regular electronic control unit sets a communication frame, containing the failure information and the priority information, according to a communication protocol based on a multi-master type such that the second priority level of the priority information follows the first priority level of the priority information in the communication frame, expresses the first priority level of the priority information such that a value of the first priority level of is lowered as the priority of the corresponding driven member is heightened, and expresses the second priority level of the priority information such that a value of the second priority level of is lowered as the priority of the corresponding driven member is heightened.

6. The control system according to claim 2, wherein the failure judging block of each regular electronic control unit sets a communication frame, containing the failure information and the priority information, according to a communication protocol based on a multi-master type, and expresses the priority information such that a value of the priority information is lowered as the priority of the corresponding driven member is heightened.

7. The control system according to claim 6, wherein, in response to communication frames outputted from a plurality of specific regular electronic control units among the regular electronic control units, the driving output control block of the backup electronic control unit controls the output changing block and the output driver such that the output driver supplies the driving outputs to the driven members, corresponding to the specific regular electronic control units one after another according to the priority indicated by pieces of priority information contained in the communication frames.

8. The control system according to claim 2, wherein
the backup electronic control unit has a plurality of output drivers that can produce respective driving outputs based on the driving method,
the information receiving block receives the failure information with the priority information from each of a plurality of particular regular electronic control units among the regular electronic control units;
the number of output drivers is set to be smaller than the number of driven members,
the number of pieces of failure information received in the information receiving block is larger than the number of output drivers, and
the driving output control block specifies a plurality of particular regular electronic control units corresponding to pieces of priority information having higher priority among the pieces of priority information received in the information receiving block such that the number of specified particular regular electronic control units is equal to the number of output drivers, controls the output drivers to produce the driving outputs, and controls the output changing block to select specific driven members corresponding to the specified particular regular electronic control units and to output the driving currents of the output drivers to the specific driven members.

9. The control system according to claim 1, wherein
each regular electronic control unit has a plurality of regular drivers corresponding to a plurality of driving methods, respectively,
each regular driver supplies the driving output based on the corresponding driving method to one driven member drivable by the driving method to drive the driven member,
the failure judging block of each regular electronic control unit judges whether or not each regular driver of the regular electronic control unit is in the failure state, the failure information outputting block of each regular electronic control unit outputs the failure information, indicating the failure state occurring in each regular driver of the regular electronic control unit, in response to the judgment of the failure judging block that the regular driver is in the failure state, the backup electronic control unit has a plurality of output drivers corresponding to the respective driving methods and a plurality of output changing blocks corresponding to the respective driving methods, each output driver can produce the driving output based on the corresponding driving method such that any of the driven members drivable by each driving method is driven in response to the driving output produced based on the driving method, each output changing block corresponding to one driving method can select any of the driven members drivable by the driving method to output the driving current of the output driver corresponding to the driving method to the selected driven member, and in response to the failure information indicating the failure state of one regular driver corresponding to a specific driving method among the driving methods in one regular electronic control unit, the driving output control block controls the output driver corresponding to the specific driving method to produce the driving output, and controls the output changing block, corresponding to the specific driving method, to select one driven member corresponding to the regular driver of the regular electronic control unit being in the failure state and to output the driving output of the output driver corresponding to the specific driving method to the selected driven member.

10. The control system according to claim 1, wherein the backup electronic control unit has a plurality of output drivers that can produce respective driving outputs based on the driving method, the number of output drivers is set to be smaller than the number of driven members, the driving output control block controls one specific output driver among the output drivers in response to the failure information outputted from the failure information outputting block of one regular electronic control unit and received in the information receiving block, and controls the output changing block to select the driven member of the regular electronic control unit, from which the failure information is outputted, and to output the driving output of the specific output driver to the selected driven member.

11. An electronic control unit, used as one of a plurality of regular electronic control units of a control system, wherein the control system comprises:

a plurality of regular electronic control units that control respective driven members, drivable by a driving method, to drive the driven members by the driving method; and a backup electronic control unit that controls each driven member instead of the regular electronic control unit controlling the driven member in response to a failure state occurring in the regular electronic control unit, each of the regular electronic control units comprising:

a regular driver that supplies a driving output based on the driving method to the corresponding driven member to drive the driven member;

a failure judging block that judges whether or not the regular electronic control unit is in a failure state such that the regular driver fails in supplying the driving output to the corresponding driven member, and sets failure information, indicating a failure state occurring in the regular electronic control unit, when the regular electronic control unit is in the failure state; and a failure information outputting block that outputs the failure information, the backup electronic control unit comprising:

an output driver that can produce a driving output based on the driving method such that any of the driven members is driven in response to the driving output;

an output changing block that can select any of the driven members to output the driving output of the output driver to the selected driven member;

an information receiving block that can receive the failure information from the failure information outputting block of any of the regular electronic control units; and a driving output control block that, in response to the failure information outputted from the failure information outputting block of one regular electronic control unit and received in the information receiving block, controls the output driver to produce the driving output, and controls the output changing block to select the driven member corresponding to the regular electronic control unit and to output the driving output of the output driver to the selected driven member.

12. An electronic control unit, used as a backup electronic control unit of a control system, wherein the control system comprises:

a plurality of regular electronic control units that control respective driven members drivable by a driving method to drive each of the driven members by the driving method; and a backup electronic control unit that controls each driven member instead of the regular electronic control unit controlling the driven member in response to a failure state occurring in the regular electronic control unit, each of the regular electronic control units comprising:

a regular driver that supplies a driving output based on the driving method to the corresponding driven member to drive the driven member;

a failure judging block that judges whether or not the regular electronic control unit is in a failure state such that the regular driver fails in supplying the driving output to the corresponding driven member, and sets failure information, indicating a failure state occurring in the regular electronic control unit, when the regular electronic control unit is in the failure state; and a failure information outputting block that outputs the failure information, the backup electronic control unit comprising:

an output driver that can produce a driving output based on the driving method such that any of the driven members is driven in response to the driving output;

an output changing block that can select any of the driven members to output the driving output of the output driver to the selected driven member;

an information receiving block that can receive the failure information from the failure information outputting block of any of the regular electronic control units; and a driving output control block that, in response to the failure information outputted from the failure information outputting block of one regular electronic control unit and received in the information receiving block, controls the output driver to produce the driving output, and controls the output changing block to select the driven member corresponding to the regular electronic control unit and to output the driving output of the output driver to the selected driven member.

\* \* \* \* \*